(12) United States Patent
Tanaka et al.

(10) Patent No.: US 9,672,174 B2
(45) Date of Patent: Jun. 6, 2017

(54) DATA-PROCESSING APPARATUS AND DATA TRANSFER CONTROL DEVICE

(71) Applicant: OLYMPUS CORPORATION, Tokyo (JP)

(72) Inventors: Yoshinobu Tanaka, Tokyo (JP); Hironobu Tomita, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 275 days.

(21) Appl. No.: 14/289,706

(22) Filed: May 29, 2014

(65) Prior Publication Data

US 2014/0365706 A1 Dec. 11, 2014

(30) Foreign Application Priority Data

Jun. 10, 2013 (JP) .................................. 2013-121934

(51) Int. Cl.
*G06F 13/24* (2006.01)
*G06F 13/30* (2006.01)
*G06F 13/16* (2006.01)

(52) U.S. Cl.
CPC .......... *G06F 13/30* (2013.01); *G06F 13/1626* (2013.01); *G06F 13/1673* (2013.01)

(58) Field of Classification Search
None
See application file for complete search history.

(56) References Cited

U.S. PATENT DOCUMENTS

2006/0059320 A1* 3/2006 Akizuki .............. G06F 12/0607
711/158
2008/0276049 A1* 11/2008 Kajigaya ............. G06F 13/1605
711/151
(Continued)

FOREIGN PATENT DOCUMENTS

JP      11-143770 A      5/1999
JP      2002-49581 A     2/2002
(Continued)

OTHER PUBLICATIONS

Office Action dated Mar. 7, 2017, issued in counterpart Japanese Application No. 2013-121934, with English translation (6 pages).

*Primary Examiner* — Elias Mamo
(74) *Attorney, Agent, or Firm* — Westerman, Hattori, Daniels & Adrian, LLP

(57) ABSTRACT

A data-processing apparatus includes: a plurality of processing blocks which is connected to a common bus; a memory which includes an address space having a plurality of banks; and a common bus arbitrating section which arbitrates an access request to access the memory, and controls data delivery through the common bus that receives the access request and is provided between the plurality of processing blocks and the memory. At least one processing block among the plural processing blocks is an exchange-processing block that performs exchange of an access order to access the banks in the memory when the communication of the data is performed between the memory and the processing block through the common bus. The exchange-processing block includes a data transfer control device that performs the exchange of the access order to access the banks by controlling the order of the data.

7 Claims, 15 Drawing Sheets

(56) References Cited

U.S. PATENT DOCUMENTS

| | | | | |
|---|---|---|---|---|
| 2012/0239873 A1* | 9/2012 | Huang | ................ | G06F 13/1626 |
| | | | | 711/105 |
| 2013/0151795 A1* | 6/2013 | Lee | ......................... | G06F 13/18 |
| | | | | 711/151 |
| 2013/0185525 A1* | 7/2013 | Lee | ......................... | G06F 12/00 |
| | | | | 711/151 |
| 2013/0215131 A1* | 8/2013 | Sato | ......................... | G06T 1/60 |
| | | | | 345/557 |

FOREIGN PATENT DOCUMENTS

| | | | |
|---|---|---|---|
| JP | 2005-11029 | A | 1/2005 |
| JP | 2006-260472 | A | 9/2006 |
| JP | 2007-299004 | A | 11/2007 |
| JP | 2009-20883 | A | 1/2009 |
| JP | 2010-27006 | A | 2/2010 |
| JP | 2010-282405 | A | 12/2010 |
| JP | 2011-3160 | A | 1/2011 |

\* cited by examiner

HORIZONTAL INVERSION

HORIZONTAL AND VERTICAL INVERSION

NON-INVERSION

VERTICAL INVERSION 0,   1,   2,   3, ···,  99
100, 101, 102, 103, ···, 199
200, 201, 202, 203, ···, 299
300, 301, 302, 303, ···, 399
400, 401, 402, 403, ···, 499

NON-INVERSION 99,  98,  97,  96, ···,   0
199, 198, 197, 196, ···, 100
299, 298, 297, 296, ···, 200
399, 398, 397, 396, ···, 300
499, 498, 497, 496, ···, 400

HORIZONTAL INVERSION

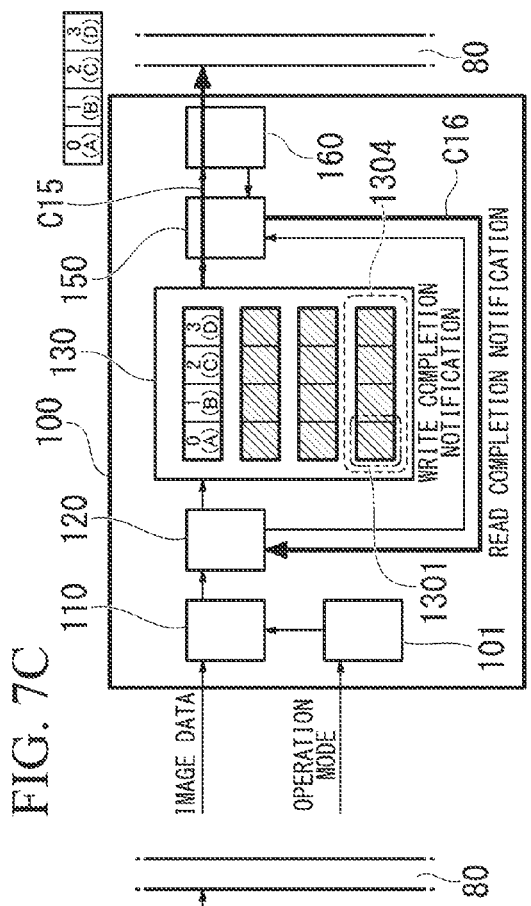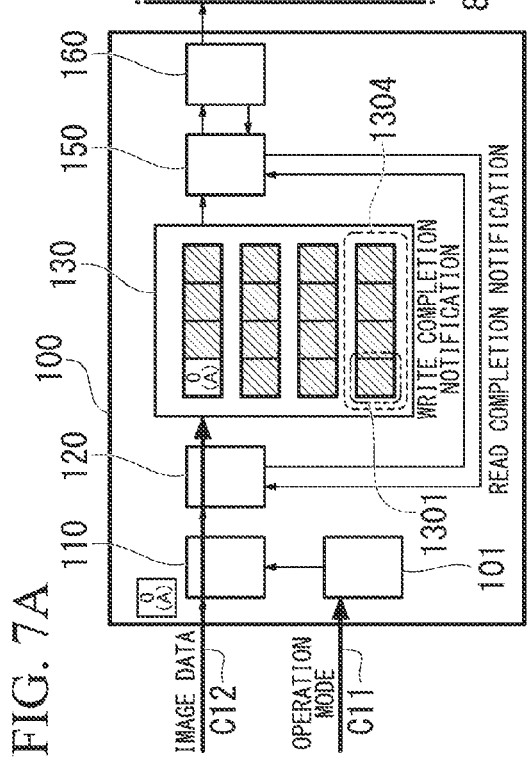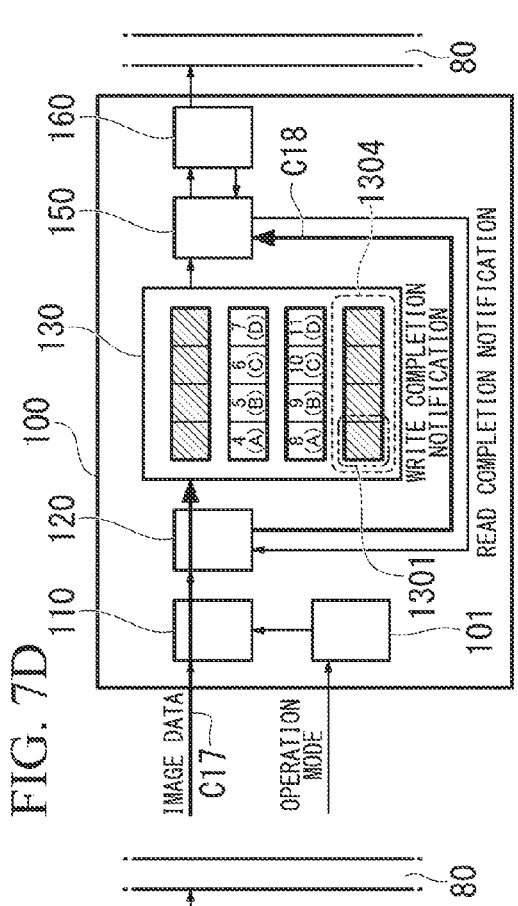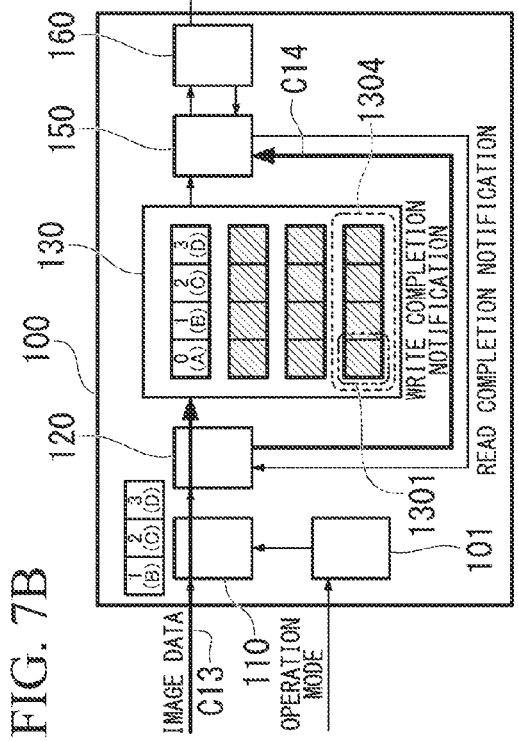

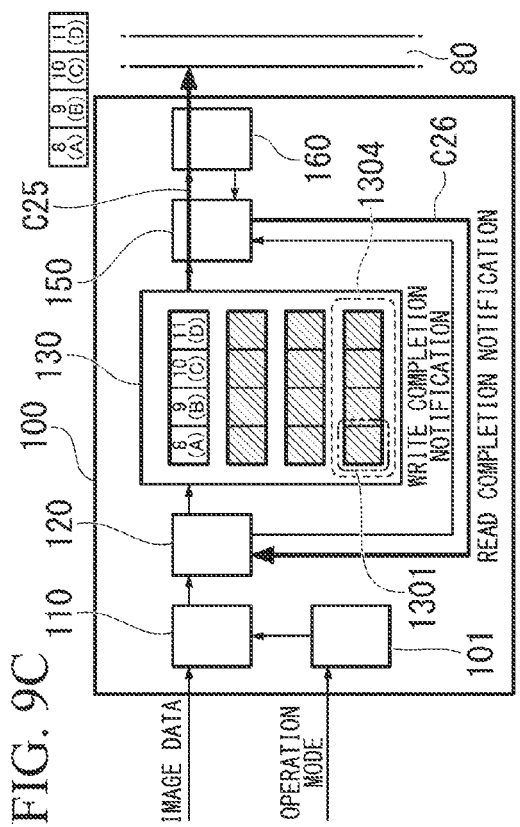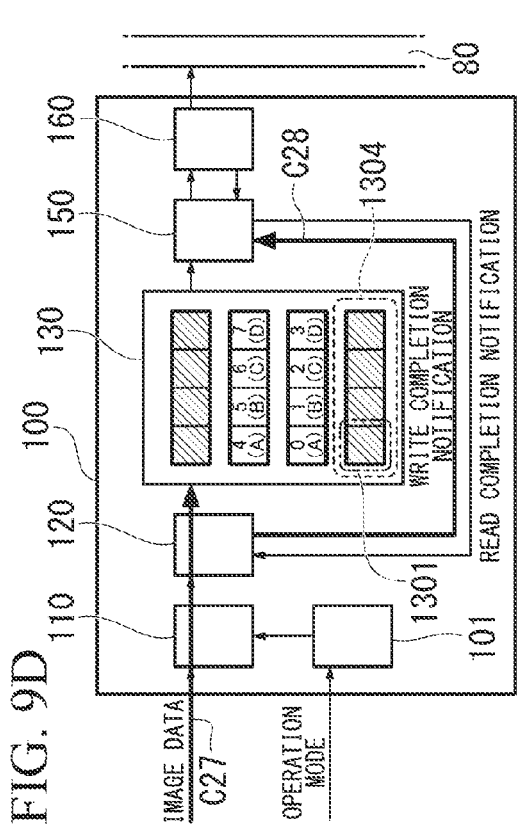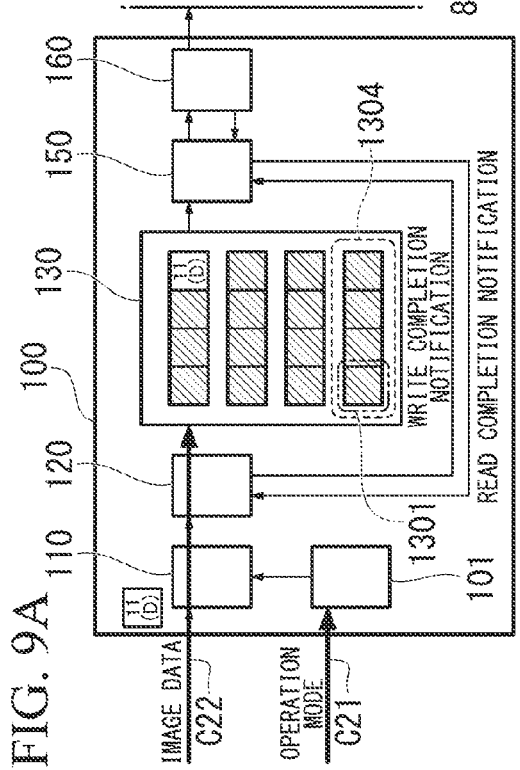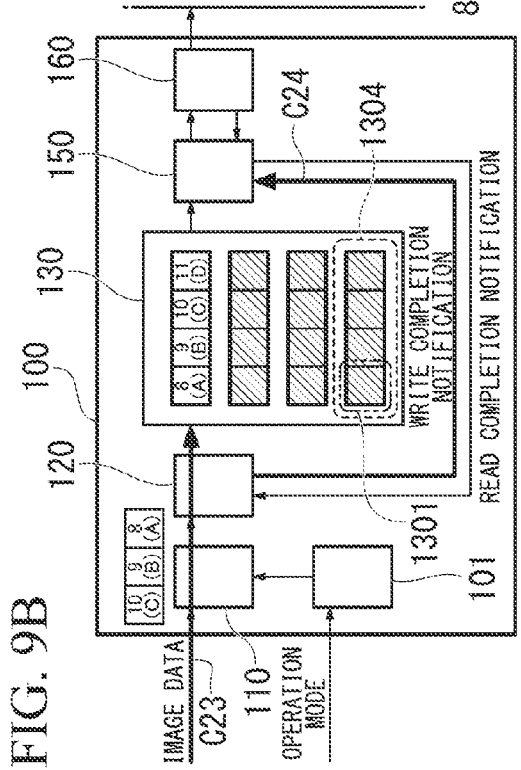

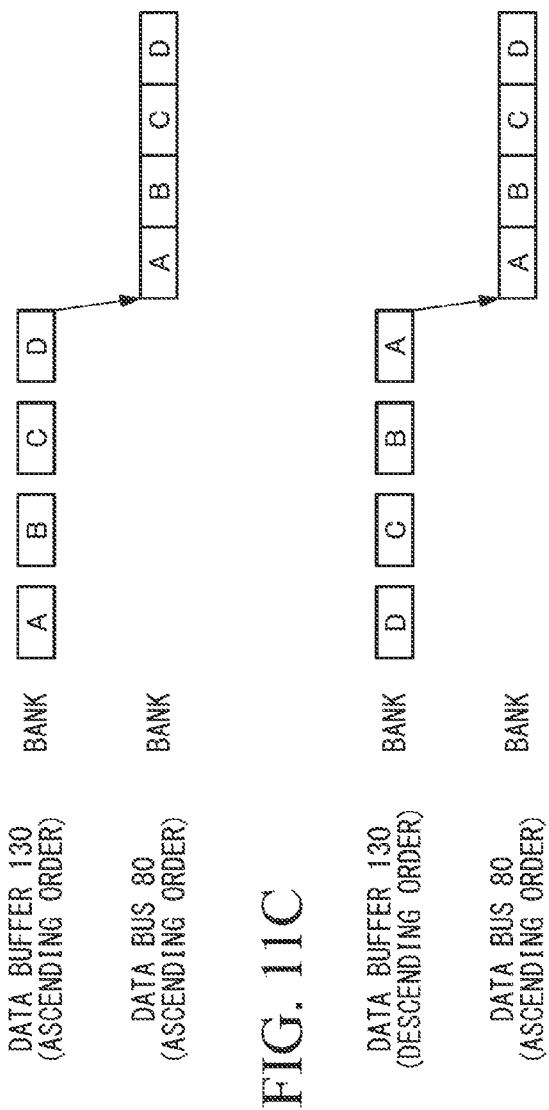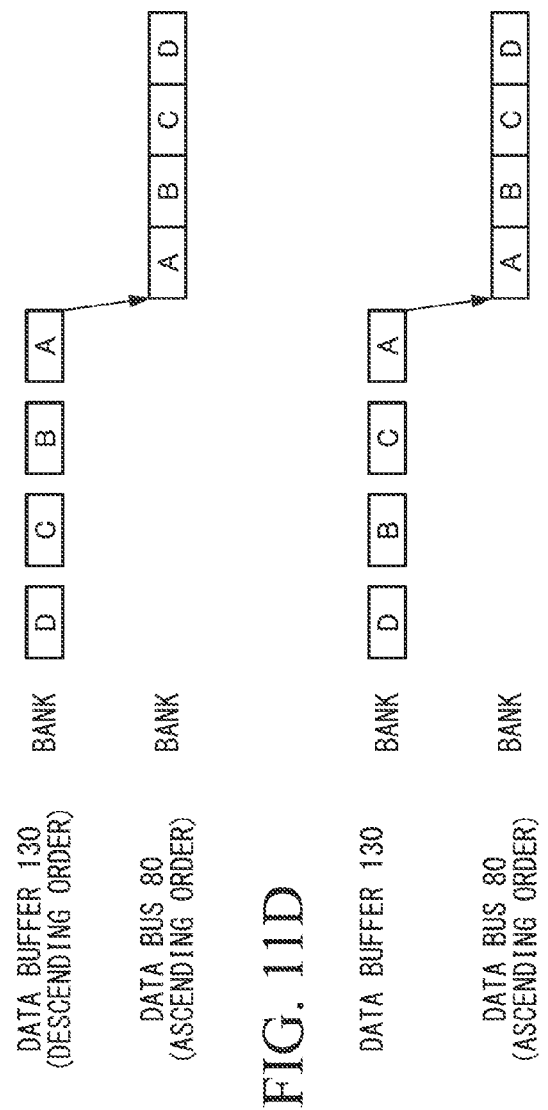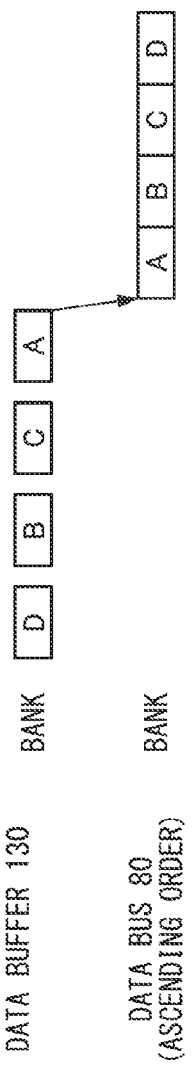
FIG. 11A
FIG. 11B
FIG. 11C
FIG. 11D

FIG. 12A

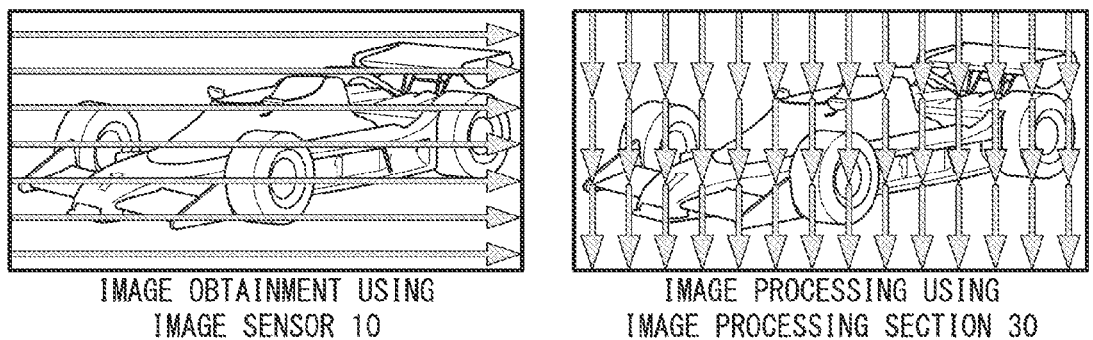

IMAGE OBTAINMENT USING           IMAGE PROCESSING USING
IMAGE SENSOR 10                  IMAGE PROCESSING SECTION 30

FIG. 12B

```
ADDRESS   0   1   2   3   4   5   6   7
BANK    | A | B | C | D | A | B | C | D |

IMAGE OBTAINMENT USING IMAGE SENSOR 10
(HORIZONTAL DIRECTION)

```
ADDRESS  0 1 2 3 4 5 6 7       100 101 102 103    200 201 202 203
BANK   | A|B|C|D|A|B|C|D |···| A|B|C|D |···| A|B|C|D |···
          FIRST LINE            SECOND LINE        THIRD LINE
```

IMAGE PROCESSING USING IMAGE PROCESSING SECTION 30
(VERTICAL DIRECTION)

```
ADDRESS  0   100  200  300  1   101  201  301  2   102  202  302
BANK   | A |-| A |-| A |-| A | B |-| B |-| B |-| B | C |-| C |-| C |-| C |
              LOSS TIME           LOSS TIME          LOSS TIME
```

IMAGE WIDTH OF VALID IMAGE

INVALID IMAGE

ADDRESS WIDTH OF EACH LINE

| ADDRESS | 0 | 1 | 2 | 3 | 4 | 5 | 6 | 7 |
|---|---|---|---|---|---|---|---|---|
| BANK | A | B | C | D | A | B | C | D |

| | 101 | 102 | 103 | 104 | 105 | 106 | 107 | 108 |
|---|---|---|---|---|---|---|---|---|
| | B | C | D | A | B | C | D | A |

| | 202 | 203 | 204 | 205 | 206 | 207 | 208 | 209 |
|---|---|---|---|---|---|---|---|---|
| | C | D | A | B | C | D | A | B |

| | 303 | 304 | 305 | 306 | 307 | 308 | 309 | 310 |
|---|---|---|---|---|---|---|---|---|
| | D | A | B | C | D | A | B | C |

IMAGE OBTAINMENT USING IMAGE SENSOR 10
(HORIZONTAL DIRECTION)

ADDRESS  0 1 2 3 4 5 6 7     101 102 103 104      202 203 204 205
BANK    [A|B|C|D|A|B|C|D]···[B|C|D|A]···[C|D|A|B]···
         FIRST LINE           SECOND LINE        THIRD LINE

IMAGE PROCESSING USING IMAGE PROCESSING SECTION 30
(VERTICAL DIRECTION)

ADDRESS  0 101 201 301  1 102 203 304  2 103 204 305  3 104 205 306
BANK    [A| B | C | D |B| C | D | A |C| D | A | B |D| A | B | C ]

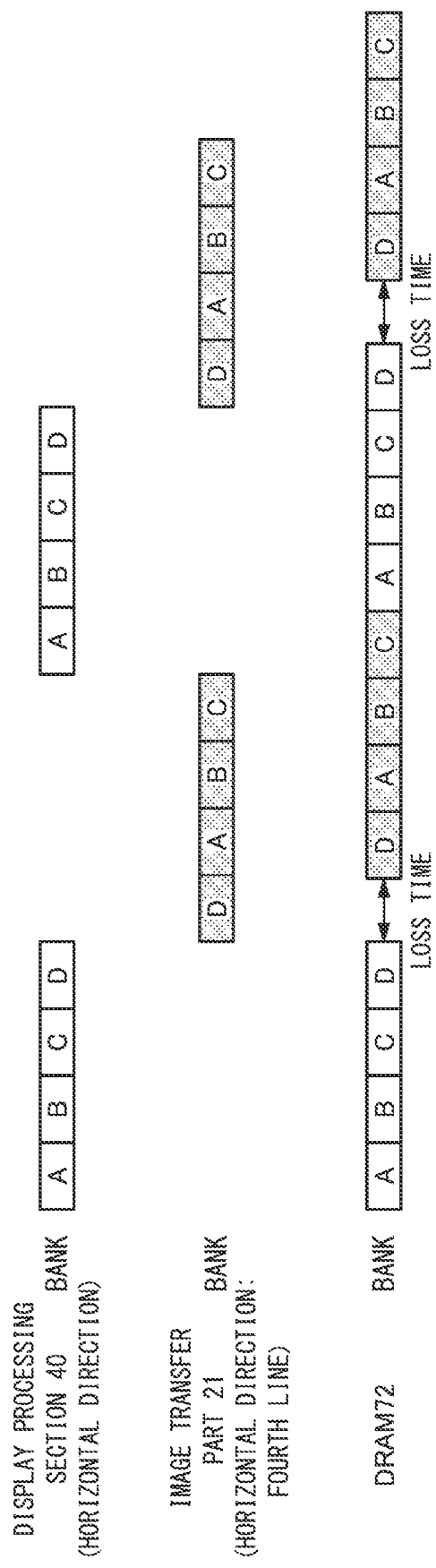

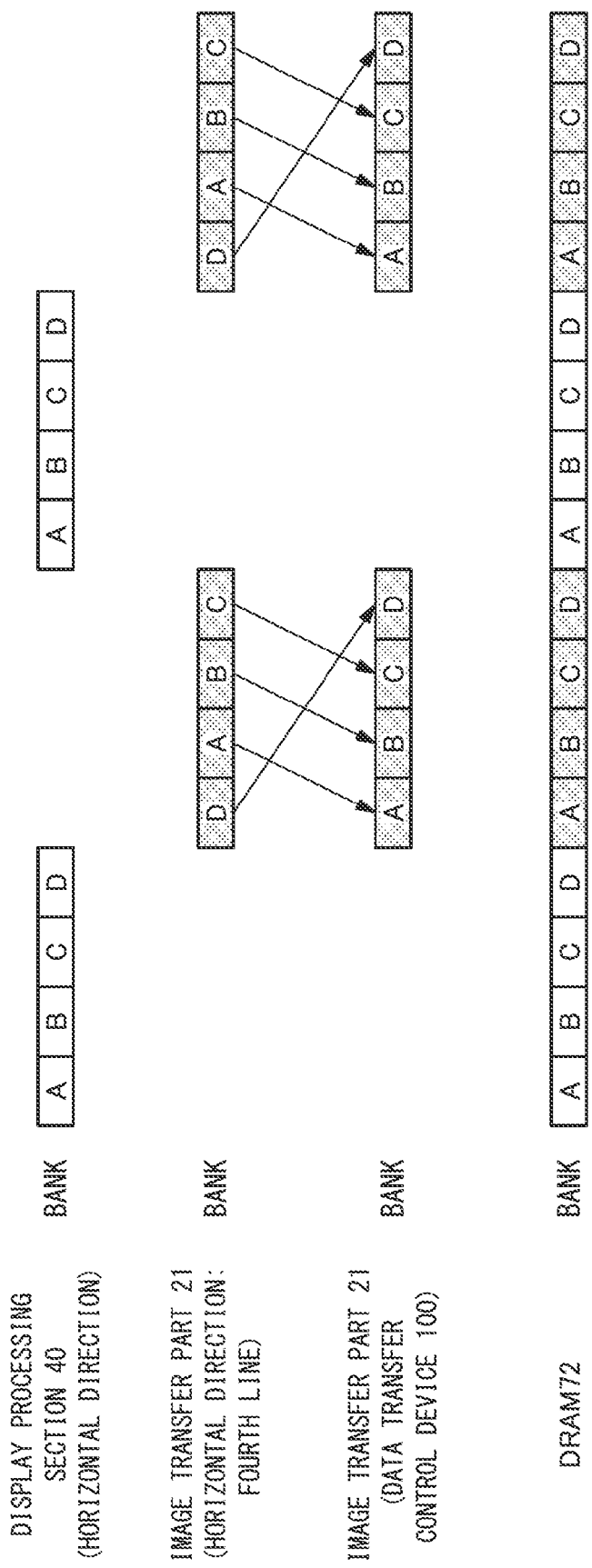

DATA-PROCESSING APPARATUS AND DATA TRANSFER CONTROL DEVICE

BACKGROUND OF THE INVENTION

Field of the Invention

The present invention relates to a data-processing apparatus and a data transfer control device.

Priority is claimed on Japanese Patent Application No. 2013-121934, filed on Jun. 10, 2013, the content of which is incorporated herein by reference.

Description of Related Art

In a variety of system LSIs such as a system LSI mounted in an image-processing apparatus such as a still image camera, a moving image camera, a medical endoscope camera or an industrial use endoscope camera, one dynamic random access memory (DRAM) connected to the system LSI is shared by plural processing blocks built in the system LSI. In such a system LSI, the plural built-in processing blocks are connected to a data bus in the system LSI, and each processing block accesses the DRAM by a direct memory access (DMA). Here, a bus arbiter controls the access to the DRAM while appropriately arbitrating an access request (DMA request) to access the DRAM, generated from each processing block.

In a general DRAM access, in order to secure a bus band of the entire data bus, a bank interleaving method is used. Here, the bus band represents the amount of data on the data bus when each processing block accesses the DRAM. In the bank interleaving, data transfer is controlled for each bank of the DRAM. When different banks of the DRAM are sequentially accessed by the bank interleaving, while data transfer from the previously accessed bank is processed, it is possible to perform an address-setting process for the next bank to be accessed, and it is thus possible to improve the data access efficiency to the DRAM.

However, in a case where the same bank in the DRAM is continuously accessed, there is a period of time when the DRAM cannot accept the access. Thus, if the same bank of the DRAM is continuously accessed by the bank interleaving, a time loss occurs during the period of time when the DRAM cannot accept the access, and thus, the data access efficiency to the DRAM deteriorates. Thus, in order to secure high data access efficiency while performing the data transfer process and the address-setting process together, it is necessary to sequentially access different banks by the bank interleaving.

Further, for arbitration of the access request to access the DRAM in a general bus arbiter, a method of preferentially receiving the access request based on the priority of each processing block, for example, the access request from a processing block with a high priority such as a processing block of which the process fails if the access to the DRAM is interrupted for a predetermined time, has been proposed. Further, a method of securing a bus band of the entire data bus by selecting a processing block of which the access request is to be received, for example, by lowering the priority of the continuous access to the same bank based on information on the bank to be accessed, has also been proposed.

However, if the system is complicated, the number of processing blocks built in the system LSI increases. Thus, the setting of the priority for the respective processing blocks becomes complicated, and thus, it is difficult to appropriately arbitrate the access request to access the DRAM from each processing block only by the bus arbiter.

In order to solve this problem, in the related art a technique has been proposed that improves the bus band of the entire data bus by the bank interleaving while securing the bus band necessary for each processing block, that is, improves the data access efficiency to the DRAM, to thereby secure performance of the system.

Japanese Unexamined Patent Application, First Publication No. 2011-3160 discloses a technique that controls a timing (request generation timing) when each processing block generates an access to request to access a DRAM or a generation method of addresses of the DRAM to be accessed by each processing block to perform a control so that a processing block having a high priority continuously accesses different banks of the DRAM. According to the technique disclosed in Japanese Unexamined Patent Application, First Publication No. 2011-3160, it is possible to secure the bus band of the entire data bus while securing the priority of each processing block, that is, to perform data transfer with high efficiency.

Further, Japanese Unexamined Patent Application, First Publication No. 2006-260472 or Japanese Unexamined Patent Application, First Publication No. 2010-27006 discloses a technique that a bus arbiter exchanges the access order to respective banks of a DRAM to avoid continuous access to the same bask of the DRAM. According to the technique disclosed in Japanese Unexamined Patent Application, First Publication No. 2006-260472 or Japanese Unexamined Patent Application, First Publication No. 2010-27006, it is possible to minimize the occurrence of the time loss when the DRAM cannot accept the access.

SUMMARY OF THE INVENTION

According to a first aspect of the invention, a data-processing apparatus includes a plurality of processing blocks which are connected to a common bus; a memory which includes an address space having a plurality of banks; and a common bus arbitrating section which arbitrates an access request to access the memory that is output from the plurality of processing blocks, and controls date delivery through the common bus that receives the access request and is provided between the plurality of processing blocks an the memory. At least one processing block among the plurality of processing blocks is an exchange-processing block that performs exchange of an access order to access the banks in the memory when the data delivery is performed between the memory and the processing block through the common bus. The exchange-processing block includes a data transfer control device that performs the exchange of the access order to the banks by controlling the order of the data that is communicated between the memory and the processing block.

According to a second aspect of the invention, in the data-processing apparatus according to the first aspect, the data transfer control device may include a buffer section which stores the data that is transferred between the memory and the processing block; a buffer write control section which stores the data in the buffer section; and a buffer read control section which reads the data stored in the buffer section.

According to a third aspect of the invention, in the data-processing apparatus according to the second aspect, the data transfer control device may further include an operation mode register that sets the order of the data that is transferred between the memory and the processing block, and the buffer write control section may store the data in storage regions of the buffer section corresponding to the banks based on the order of the data set by the operation mode register.

According to a fourth aspect of the invention, in the data-processing apparatus according to the second aspect, the data transfer control device may further include an operation mode register that sets the order of the data that is transferred between the memory and the processing block, and the buffer read control section may read the data from storage regions of the buffer section corresponding to the banks based on the order of the data set in the operation mode register.

According to a fifth aspect of the invention, in the data-processing apparatus according to any one of the first to fourth aspects, the data transfer control device may access the banks in a reverse order to the order of the banks in the memory.

According to a sixth aspect of the invention, in the data-processing apparatus according to any one of the first to fifth aspects, the data may be data which has regions in a first direction and a second direction, the data-processing apparatus may further include the plurality of exchange-processing blocks, at least one exchange-processing block among the plurality of exchange-processing blocks may access the banks in the memory in the first direction of the data, and at least another exchange-processing block among the plurality of processing blocks that performs the exchange of the access order to the banks in the memory may access the banks in the memory in the second direction of the data.

According to a seventh aspect of the invention, in the data-processing apparatus according to the sixth aspect, the data may be image data, the first direction may be a horizontal direction of the image data, and the second direction may be a vertical direction of the image data.

According to an eighth aspect of the invention, a data transfer control device used for a data-processing apparatus is provided, including a plurality of processing blocks which is connected to a common bus; a memory which includes an address space having a plurality of banks; and a common bus arbitrating section which arbitrates an access request to access the memory that is output from the plurality of processing blocks, and controls data delivery through the common bus which receives the access request and is provided between the plurality of processing blocks and the memory. The data transfer control device is provided in at least one preprocessing block among the plurality of processing blocks, and performs exchange of an access order to the banks in the memory when the processing block performs the data delivery between the memory and the processing block through the common bus by controlling the order of the data that is communicated between the memory and the processing block.

BRIEF DESCRIPTION OF THE DRAWINGS

FIG. 7 is a diagram illustrating an example of a DMA operation in the first exchange process of the data transfer control device provided in the image-processing apparatus according to the present embodiment.

FIG. 7B is a diagram illustrating an example of the DMA operation in the first exchange process of the data transfer control device provided in the image-processing apparatus according to the present embodiment.

FIG. 7C is a diagram illustrating an example of the DMA operation in the first exchange process of the data transfer control device provided in the image-processing apparatus according to the present embodiment.

FIG. 7D is a diagram illustrating an example of the DMA operation in the first exchange process of the data transfer control device provided in the image-processing apparatus according to the present embodiment.

FIG. 9A is a diagram illustrating another example of the DMA operation in the first exchange process of the data transfer control device provided in the image-processing apparatus according to the present embodiment.

FIG. 9B is a diagram illustrating another example of the DMA operation in the first exchange process of the data transfer control device provided in the image-processing apparatus according to the present embodiment.

FIG. 9C is a diagram illustrating another example of the DMA operation in the first exchange process of the data transfer control device provided in the image-processing apparatus according to the present embodiment.

FIG. 9D is a diagram illustrating another example of the DMA operation in the first exchange process of the data transfer control device provided in the image-processing apparatus according to the present embodiment.

FIG. 11A is a diagram illustrating the DMA operation in the data transfer control device provided in the image-processing apparatus according to the present embodiment.

FIG. 11B is a diagram illustrating the DMA operation in the data transfer control device provided in the image-processing apparatus according to the present embodiment.

FIG. 11C is a diagram illustrating the DMA operation in the data transfer control device provided in the image-processing apparatus according to the present embodiment.

FIG. 11D is a diagram illustrating the DMA operation in the data transfer control device provided in the image-processing apparatus according to the present embodiment.

FIG. 12A is a diagram schematically illustrating an example of a transfer direction of image data in the image-processing apparatus according to the present embodiment.

FIG. 12B is a diagram schematically illustrating an example of the access of image data to the DRAM in the image-processing apparatus according to the present embodiment.

FIG. 12C is a diagram schematically illustrating an example of the access of image data to the DRAM in the image-processing apparatus according to the present embodiment.

FIG. 14 is a diagram schematically illustrating an example of a time loss due to a bank access to the DRAM in the processing block provided in the image-processing apparatus according to the present embodiment.

FIG. 15 is a diagram schematically illustrating an example of avoiding the time loss due to the bank access to the DRAM by a second exchange process using the processing block provided in the image-processing apparatus according to the present embodiment.

DETAILED DESCRIPTION OF THE INVENTION

Figure 1:
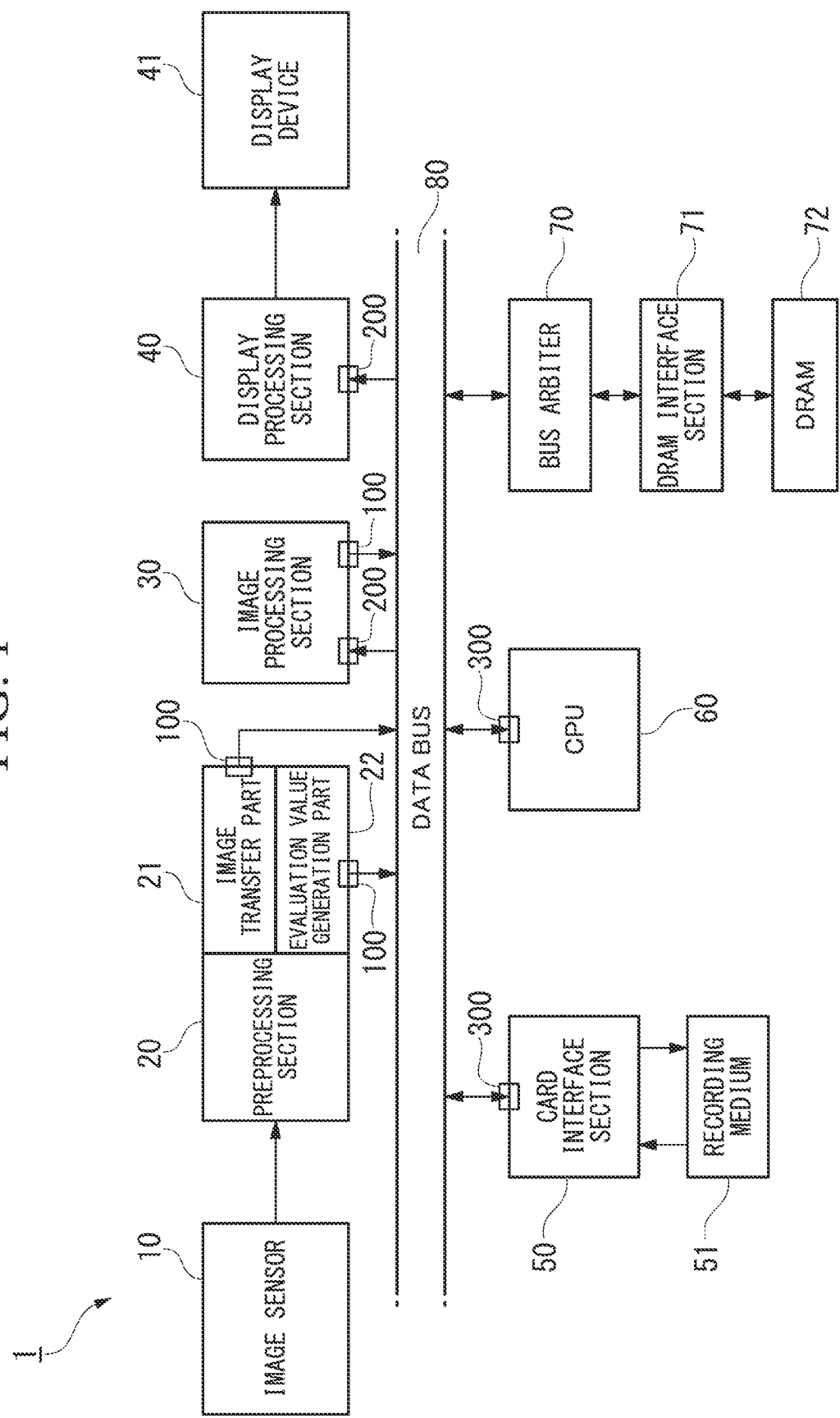
FIG. 1 is a block diagram schematically illustrating a configuration of an image-processing apparatus to which a data transfer control device according to an embodiment of the invention is applied.
Figure 2B:
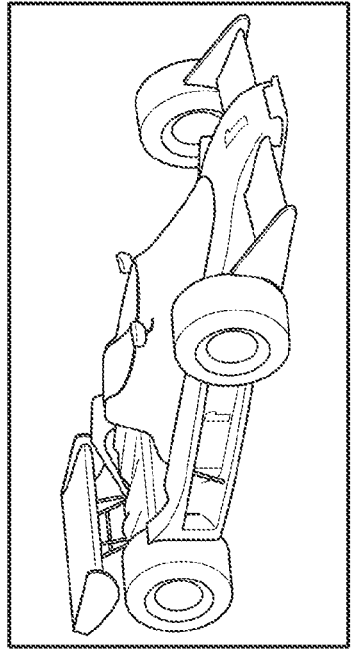
FIG. 2B is a diagram illustrating an example of an image inversion process in the image-processing apparatus according to the present embodiment.
Figure 2D:
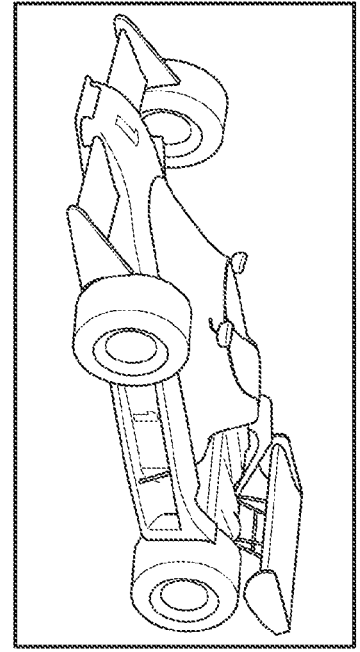
FIG. 2D is a diagram illustrating an example of the image inversion process in the image-processing apparatus according to the present embodiment.
Figure 2A:
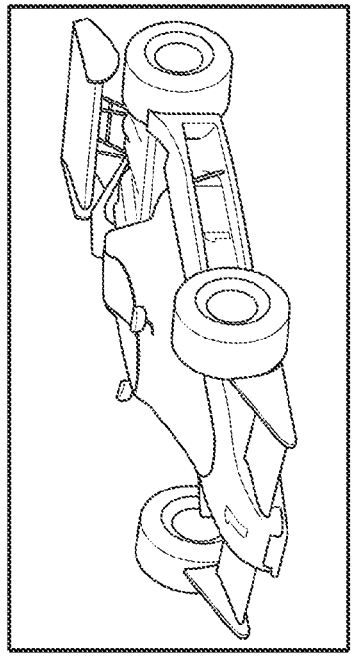
FIG. 2A is a diagram illustrating an image that is not subject to an inversion process in the image-processing apparatus according to the present embodiment.
Figure 2C:
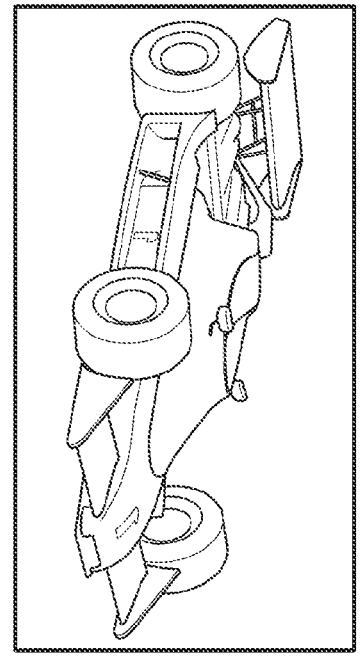
FIG. 2C is a diagram illustrating an example of the image inversion process in the image-processing apparatus according to the present embodiment.

Hereinafter, embodiment of the invention will be described with reference to the accompanying drawings. In the present embodiment, an example will be described that an image-processing apparatus such as a still image camera is provided as a data-processing apparatus of the present invention and a data transfer control device of the present invention is applied to the data-processing apparatus. FIG. 1 is a block diagram schematically illustrating a configuration of an image-processing apparatus to which a data transfer control device according to the present embodiment is applied. In FIG. 1, an image-processing apparatus 1 includes an image sensor 10, a preprocessing section 20 that includes an image transfer part 21 and an evaluation value generation part 22, an image-processing section 30, a display processing section 40, a display device 41, a card interface section 50, a recording medium 51, a CPU 60, a bus arbiter 70, a DRAM interface section 71 and a DRAM 72.

As shown in FIG. 1, the image transfer part 21, the evaluation value generation part 22, the image-processing section 30, the display processing section 40, the card interface section 50 and the CPU 60 in the image-processing apparatus 1 are connected to a data bus 80 that is a common bus through a data transfer control device 100, a data transfer control device 200 and a data transfer control device 300 according to the present embodiment. Further, each processing block connected to the data bus 80 outputs a DRAM access request such as a DMA request to the bus arbiter 70 through the data bus 80, reads data from the DRAM 72 controlled by the DRAM interface section 71 connected to the bus arbiter 70, and performs data writing to the DRAM 72. In the data bus 80, signals such as a DMA request signal, a DMA reception signal, a read/write control signal (RW control signal), an address, and data are included so that each processing block performs DMA between the DRAM 72 and each processing block.

The image sensor 10 is an image sensor represented by a charge-coupled device (CCD) image sensor that photo-electrically converts an optical image of a subject formed by a lens (not shown) or a complementary metal-oxide semiconductor (CMOS) image sensor. The image sensor 10 outputs an image signal based on subject light, (hereinafter, referred to as "input image data") to the preprocessing section 20.

The processing section 20 is a processing block that performs preprocessing such as defect correction or shading correction to the input image data input from the image sensor 10. The image transfer part 21 provided in the preprocessing section 20 transfers (writes) image data that is a preprocessed result (hereinafter, referred to as "preprocessed image data") to the DRAM 72. Further, the evaluation value generation part 22 provided in the preprocessing section 20 generates an evaluation value for performing a control such as auto exposure (AE), auto focus (AF) or auto white balance (AWB) based on the preprocessed image data, and transfers (writes) the generated evaluation value to the DRAM 72.

The image transfer part 21 and the evaluation value generation part 22 output a DMA request signal to access the DRAM 72 to the bus arbiter 70 while transferring the preprocessed image data or the evaluation value to the DRAM 72.

Further, after the DMA request is received by the bus arbiter 70 and a DMA reception signal is input, the image transfer part 21 and the evaluation value generation part 22 output the preprocessed image data or the evaluation value to the DRAM 72 through the bus arbiter 70 and the DRAM interface section 71.

The image-processing section 30 is a processing block that obtains (reads) the preprocessed image data stored in the DRAM 72 and performs various image processing such as noise removal, YC conversion, resizing or JPEG compression to generate display image data or recording image data. Further, the image-processing section 30 is a processing block that transfers (writes) the generated display image data and recording image data to the DRAM 72 again.

When obtaining the preprocessed image data from the DRAM 72, the image-processing section 30 outputs a DMA request signal to access the DRAM 72, to the bus arbiter 70. Further, after the DMA request is received in the bus arbiter 70 and a DMA reception signal is input, the image-processing section 30 reads the preprocessed image data from the DRAM 72 through the DRAM interface section 71 and the bus arbiter 70.

Further, when transferring the display image data and the recording image data to the DRAM 72, the image-processing section 30 outputs a DMA request signal to access the DRAM 72 to the has arbiter 70.

Further, after the DMA request is received in the bus arbiter 70 and a DMA reception signal is input, the image-processing section 30 outputs the generated display image data and recording image data to the DRAM 72 through the bus arbiter 70 and the DRAM interface section 71.

The display processing section 40 is a processing block that obtains (reads) the display image data stored to the DRAM 72, performs display processing such as a process of superimposing on-screen display (OSD) data on the obtained display image data and outputs the result to the display device 41.

When obtaining the display image data from the DRAM 72, the display processing section 40 outputs a DMA request signal to access the DRAM 72 to the bus arbiter 70. Further, after the DMA request is received in the bus arbiter 70 and a DMA reception signal is input, the display processing section 40 reads the display image date from the DRAM 72 through the DRAM interface section 71 and the bus arbiter 70. Further, after performing the display processing for the read display image data, the display processing section 40 outputs the image data after the display processing to the display device 41.

The display device 41 is a display device such as a thin film transistor (TFT) liquid crystal display (LCD) or an organic electro luminescence (EL) display, and displays an image based on the image data after the display processing output from the display processing section 40.

The card interface section 50 is a processing block that obtains (reads) the recording image data stored in the DRAM 72 and records the result on the recording medium 51. Further, the card interface section 50 is a processing block that reads the image data recorded on the recording medium 51 and transfers (writes) the read image data to the DRAM 72.

When obtaining the recording image data from the DRAM 72, the card interface section 50 outputs a DMA request signal to access the DRAM 72 to the bus arbiter 70. Further, after the DMA request is received in the bus arbiter 70 and a DMA reception signal is input, the card interface section 50 reads the recording image data from the DRAM 72 through the DRAM interface section 71 and the bus arbiter 70. Further, the card interface section 50 outputs the read recording image data to the recording medium 51 to be recorded thereon.

Further, when transferring the image data read from the recording medium 51 to the DRAM 72, the card interface section 50 outputs a DMA request signal to access the DRAM 72 to the bus arbiter 70. Further, after the DMA request is received in the bus arbiter 70 and a DMA reception signal is input, the card interface section 50 outputs the image data read from the recording medium 51 to the DRAM 72 through the bus arbiter 70 and the DRAM interface section 71.

The recording medium 51 is a recording medium such as a memory card, and records thereon the recording image data output from the card interface section 50. Further, the image data recorded thereon is read by the card interface section 50. In FIG. 1, the recording medium 51 is also shown as a component of the image-processing apparatus 1, but the recording medium 51 is detachably provided in the image-processing apparatus 1.

The CPU 60 is a processing block that controls the component of the image-processing apparatus 1, that is, the entirety of the image-processing apparatus 1. Even when the CPU 60 controls the components of the image-processing apparatus 1, the access to the DRAM 72 is similarly performed. Here, data obtained (read) from the DRAM 72 by the CPU 60 or data to be transferred (to be written) to the DRAM 72 includes data on parameters for setting the operations of the components of the image-processing apparatus 1 in addition to the image data in the above-described processing blocks.

When obtaining data from the DRAM 72 by the DMA, the CPU 60 outputs a DMA request signal to access the DRAM 72 to the bus arbiter 70. Further, after the DMA request is received in the bus arbiter 70 and a DMA reception signal is input, the CPU 60 reads the obtained data from the DRAM 72 through the DRAM interface section 71 and the bus arbiter 70.

Further, when transferring the data to the DRAM 72 by the DMA, the CPU 60 outputs a DMA request signal to access the DRAM 72 to the bus arbiter 70. Further, after the DMA request is received in the bus arbiter 70 and a DMA reception signal is input, the CPU 60 outputs the data to be transferred to the DRAM 72 through the bus arbiter 70 and the DRAM interface section 71.

The bus arbiter (common has arbitrating section) 70 performs arbitration of the data transfer (writing) to the DRAM 72 and the data obtainment (reading) from the DRAM 72 according to the DMA requests from the plural processing blocks of the image-processing apparatus 1 connected to the data bus 80.

More specifically, the bus arbiter 70 performs arbitration of the access to the DRAM 72 from the respective processing blocks based on the priority of bank interleaving or the respective processing blocks, according to the DMA request signals input from the processing blocks, to determine a processing block for reception of the DMA request. Further, the bus arbiter 70 outputs the DMA reception signal to the determined processing block.

Then, when the determined processing block transfers data to the DRAM 72, the bus arbiter 70 outputs an RW control signal indicating data writing to the DRAM 72, an address of the DRAM 72 input from the processing block and data to be transferred to the DRAM interface section 71. Further, when the determined processing block obtains data from the DRAM 72, the bus arbiter 70 outputs an RW control signal indicating data reading from the DRAM 72 and an address of the DRAM 72 input from the processing block to the DRAM interface section 71. Then, the bus arbiter 70 outputs the data input from the DRAM interface section 71, that is, the data obtained from the DRAM 72 to the determined processing block.

The DRAM interface section 71 performs a control of the data writing to or the data reading from the DRAM 72 based on the RW control signal indicating the writing to or the reading from the DRAM 72 input from the bus arbiter 70 and the address of the DRAM 72. That is, the DRAM interface section 71 executes the data writing to the DRAM 72 or the data reading from the DRAM 72 based on the access to the DRAM from the processing block determined by the bus arbiter 70.

More specifically, when the RW control signal input from the bus arbiter 70 represents the writing to the DRAM 72, the DRAM interface section 71 outputs data input from the bus arbiter 70 to the DRAM 72. Further, when the RW control signal input from the bus arbiter 70 represents the reading from the DRAM 72, the DRAM interface section 71 outputs data output torn the DRAM 72 to the has arbiter 70.

The DRAM 72 is a memory that is access-controlled by the DRAM interface section 71 and stores a variety of data in the processing processes of the processing blocks in the image-processing apparatus 1.

As described above, each processing block in the image-processing apparatus 1 outputs, when accessing to the DRAM 72, the DMA request to the bus arbiter 70. Further, after the DMA request is received in the bus arbiter 70, each block performs the data writing to the DRAM 72 or the data reading from the DRAM 72 through the data bus 80, the bus arbiter 70 and the DRAM interface section 71.

First Exchange Process

Figure 3A:
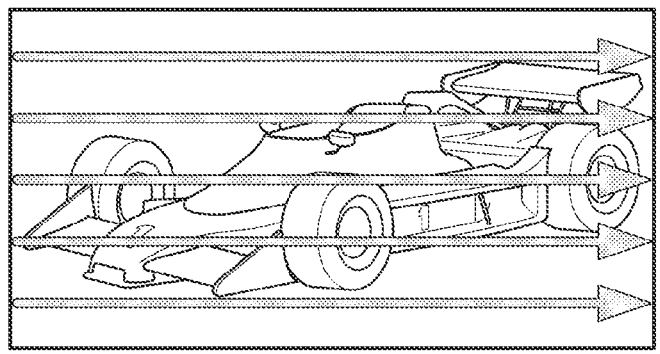
FIG. 3A is a diagram schematically illustrating an example of an accessing method to a DRAM in the image inversion process in the image-processing apparatus according to the present embodiment.
Figure 3B:
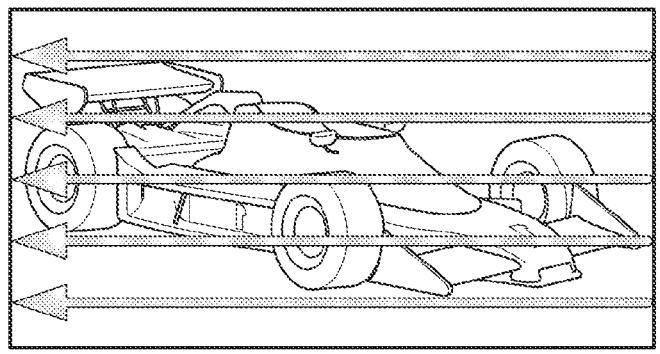
FIG. 3B is a diagram schematically illustrating an example of the accessing method to the DRAM in the image inversion process in the image-processing apparatus according to the present embodiment.

Here, in order to describe a method for access the DRAM 72 in each processing block of the image-processing apparatus 1, an example of an operation of the image-processing apparatus 1 will be described with reference to FIGS. 2A to 2D, and FIGS. 3A and 3B. The image-processing apparatus 1 may perform a process of inverting a current image (hereinafter, referred to as an "inversion process") due to functions of the image-processing apparatus 1, restrictions in design or manufacturing of the image-processing apparatus 1, or the like. FIGS. 2A to 2D are diagrams illustrating an example of an inversion process of an image in the image-processing apparatus 1 according to the present embodiment. Further, FIGS. 3A and 3B are diagrams schematically illustrating an example of a method for access to the DRAM 72 in the inversion process of the image in the image-processing apparatus 1 according to the present embodiment.

For example, in the image-processing apparatus 1, there is a case where the image sensor 10 should be disposed in a state of being rotated at an angle of 180° due to a layout restriction of a substrate where the image sensor 10 is disposed. In this case, an image is formed in the image sensor 10 in a state of being horizontally and vertically inverted. Thus, when the preprocessing section 20 preprocesses the input image data input from the image sensor 10 and transfers the result to the DRAM 72, the preprocessing section 20 inverts the preprocessed image data horizontally and vertically and outputs the result (see FIG. 2D). Further, for example, in the image-processing apparatus 1, in a case where a refraction optical system or the like is used as an optical system such as a lens, a direction of an optical image of a subject formed in the image sensor 10 may include various directions such as a horizontally inverted state, a vertically inverted state or a horizontally and vertically inverted state according to the arrangement of a reflection mirror. In this case, similarly, when the preprocessing section 20 preprocesses the input image data input from the image sensor 10 and transfers the result to the DRAM 72, the preprocessing section 20 inverts the preprocessed image data horizontally, vertically or horizontally and vertically and outputs the result (see FIGS. 2B to 2D).

For example, in the image-processing apparatus 1, there is a case where the display device 41 should be disposed in a state of being rotated at an angle of 180° due to a layout restriction of a substrate where the display device 41 is disposed. In this case, an image is displayed in the display device 41 in a state of being horizontally and vertically inverted. Thus, when the display processing section 40 obtains (reads) the display image data from the DRAM 72, the display processing section 40 inverts the display image data horizontally and vertically and outputs the inverted display image data to the display device 41 (see FIG. 2D). Further, for example, as a function in the image-processing apparatus 1, in a case where the display device 41 of a movable type is mounted, an image displayed in the display device 41 may be formed in various directions such as a horizontally inverted state, a vertically inverted state or a horizontally and vertically inverted state according to situations of a movable section. In this case, similarly when the display processing section 40 obtains (reads) the display image data from the DRAM 72, the display processing section 40 inverts the display image data horizontally, vertically or vertically and horizontally according to the situations of the movable section, and outputs the inverted display image data to the display device 41 (see FIGS. 2B to 2D).

As described above, in the image-processing apparatus 1, it is necessary to perform the inversion process for the image according to the restriction of the installation direction of the image sensor 10, the restriction of the direction of the optical image of the subject formed by the optical system such as a lens, the restriction of the installation direction of the display device 41 and the function of correctly displaying the image in the display device 41 of the movable type. Thus, in each processing block provided in the image-processing apparatus 1, by controlling the address in the access to the DRAM 72, the inversion process of the image data is performed.

For example, as shown in FIGS. 3A and 3B, it may be considered that the current image is horizontally inverted to be displayed in the display device 41. When the input image data is input from the image sensor 10 in a direction shown in FIG. 3A, the preprocessing section 20 and the image-processing section 30 are respectively sequentially allocated addresses of the DRAM 72 from the left side of the image to the right side thereof, and transfers (writes) the preprocessed image data and the processed display image data to the DRAM 72. FIG. 3A shows a state where addresses are sequentially allocated from the left side of the image in the ascending order of 0, 1, 2, 3, . . . , 99, for example, and the display image data is transferred to the DRAM 72.

Then, as shown in FIG. 3B, since the display processing section 40 display the image that is horizontally inverted in the display device 41, the display image data stored in the DRAM 72 is sequentially obtained (read) from the right side of the image to the left side thereof. That is, as shown in FIG. 3B, the stored display image data is sequentially read from the right side of the image in the descending address order of 99, 98, 97, 96, . . . , 0, for example. By reading, the display usage data stored in the DRAM 72 while reversing the address order it is possible to horizontally invert the image.

Figure 4:
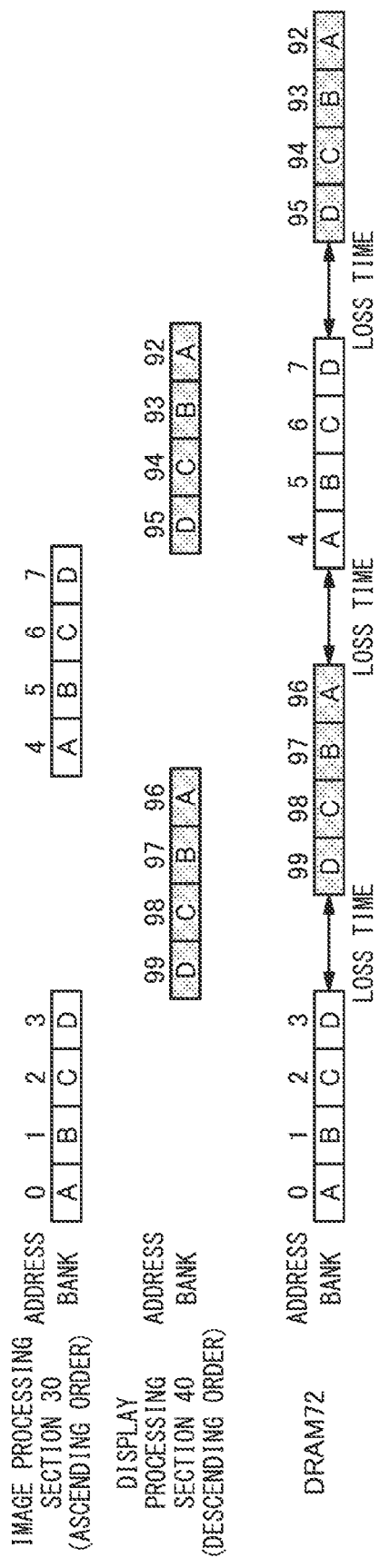
FIG. 4 is a diagram schematically illustrating an example of a time loss due to a bank access to the DRAM in a processing block provided in the image-processing apparatus according to the present embodiment.

Here, when the addresses of 0 to 99 in the above example are addresses for different banks of the DRAM 72, which are not addresses for the same bank of the DRAM 72, continuous access to the same bank of the DRAM 72 due to bank interleaving is generated, and thus, the access efficiency to the DRAM 72 may deteriorate. FIG. 4 is a diagram schematically illustrating an example of a time loss due to a bank access to the DRAM 72 in a processing block provided in the image-processing apparatus 1 according to the present embodiment. FIG. 4 shows a timing in a case where, in the access to the DRAM 72 in which the image-processing section 30 that does not perform the inversion process designates the addresses of the DRAM 72 in the ascending order to transfer the display image data to the DRAM 72 and the display processing section 40 that performs the inversion process designates the addresses of the DRAM 72 in the descending order to obtain the display image data, the respective addresses are addresses that designate different banks.

As shown in FIG. 4, if the image-processing section 30 and the display processing section 40 alternately perform the access to the DRAM 72, when the processing block that accesses the DRAM 72 is exchanged, continuous access to the same bank of the DRAM 72 is generated. More specifically, the image-processing section 30 that does not perform the inversion process designates the addresses of the DRAM 72 in the ascending order to access the respective banks of the DRAM 72 in the order of a bank A, a bank B, a bank C and a bank D, and then, the display processing section 40 that performs the inversion process designates the addresses of the DRAM 72 in the descending order to access the respective banks of the DRAM 72 in the order of bank D, bank C, bank B and bank A. Thus, the access to the bank D from the image-processing section 30 and the access to the bank D from the display processing section 40 are continuously performed. Here, since the DRAM 72 cannot receive the continuous access to the bank D, this period of time becomes the time loss, and the access efficiency to the DRAM 72 deteriorates.

Figure 5:
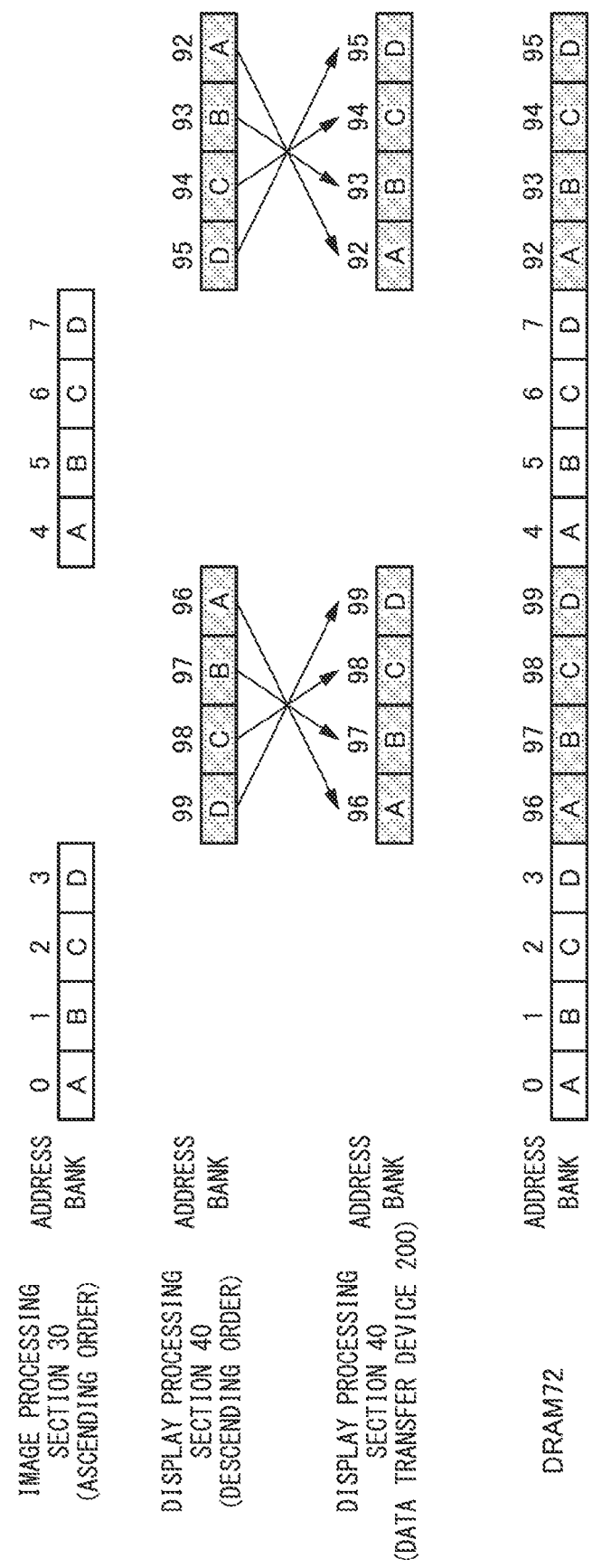
FIG. 5 is a diagram schematically illustrating an example of avoiding the time loss due to the bank access to the DRAM by a first exchange process using the processing block provided in the image-processing apparatus according to the present embodiment.

Thus, the data transfer control device provided in each processing block exchanges the bank order when the corresponding processing block accesses the DRAM 72, to thereby avoid the continuous access to the same bank of the DRAM 72. FIG. 5 is a diagram schematically illustrating an example of avoiding the time loss due to the bank access to the DRAM 72 by a first exchange process using the processing block (exchange-processing block) provided in the image-processing apparatus 1 according to the present embodiment. Similarly to the access to the banks of the DRAM 72 shown in FIG. 4. FIG. 5 shows a timing in a case where, in the access to the DRAM 72 in which the image-processing section 30 that does not perform the inversion process designates the addresses of the DRAM 72 in the ascending order to transfer the display image data to the DRAM 72 and the display processing section 40 that performs the inversion process designates the addresses of the DRAM 72 in the descending order to obtain the display image data, the respective addresses are addresses that designate different banks.

As shown in FIG. 5, if the image-processing section 30 and the display processing section 40 alternately perform the access to the DRAM 72, similarly to the access to the banks of the DRAM 72 shown in FIG. 4, when the processing block that accesses the DRAM 72 is exchanged, continuous access to the same bank of the DRAM 72 is generated. However, in the bank access to the DRAM 72 shown in FIG. 5, the data transfer control device 200 provided in the display processing section 40 exchanges the access order to the respective banks of the DRAM 72. Thus, the display processing section 40 can avoid the continuous access to the same bank of the DRAM 72 due to the bank interleaving.

More specifically similarly to the access to the hanks of the DRAM 72 shown in FIG. 4, the image-processing section 30 that does not perform the inversion process designates the addresses of the DRAM 72 in the ascending order to access the respective banks of the DRAM 72 in the order of bank A, bank B, bank C and bank D, and then, the display processing section 40 that does not perform the inversion process designates the addresses of the DRAM 72 in the descending order to access the respective banks of the DRAM 72 in the order of bank D, bank C, bank B and bank A. Thus, similarly to the access to the banks of the DRAM 72 shown in FIG. 4, the access to the bank D from the image-processing section 30 and the access to the bank D from the display processing section 40 are continuously performed. Here, the data transfer control device 200 provided in the display processing section 40 exchanges access order to the respective banks of the DRAM 72 to the same order of bank A, bank B, bank C and bank D as in the image-processing section 30. Thus, even in a case where the image-processing section 30 that does not perform the inversion process and the display processing section 40 that performs the inversion process alternately perform the access to the DRAM 72, it is possible to avoid the continuous access to the same bank of the DRAM 72.

The data transfer control device provided in each processing block in the image-processing apparatus 1 exchanges the bank order when the corresponding processing block accesses the DRAM 72 to become the same order as the bank order when the other processing block accesses the DRAM 72. Thus, the bank orders when the processing blocks access the DRAM 72 are the same in all the processing blocks in the image-processing apparatus 1. Thus, even in a case where a processing block that does not perform the inversion process in the image-processing apparatus 1 and a processing block that performs the inversion process are present together and the plural processing blocks access the DRAM 72, continuous access to the same bank of the DRAM 72 due to the bank interleaving is not generated. Thus, it is possible to suppress reduction in the access efficiency to the DRAM 72 due to the time loss.

Next, the data transfer control device provided in each processing block in the image-processing apparatus 1 will be described. The data transfer control device 100, the data transfer control device 200 and the data transfer control device 300 are different from each other in data input and output directions, but are the same from the viewpoint that data is input and output. Accordingly, in the following description, the data transfer control device 100 provided in the image transfer part 21, the evaluation value generation part 22 and the image-processing section 30 in the image-processing apparatus 1 will be described as a representative. In the following description, the preprocessed image data output by the image transfer part 21, the evaluation value output by the evaluation value generation part 22, and the display image data and the recording image data output by the image-processing section 30 are collectively referred to as "image data".

Figure 6:
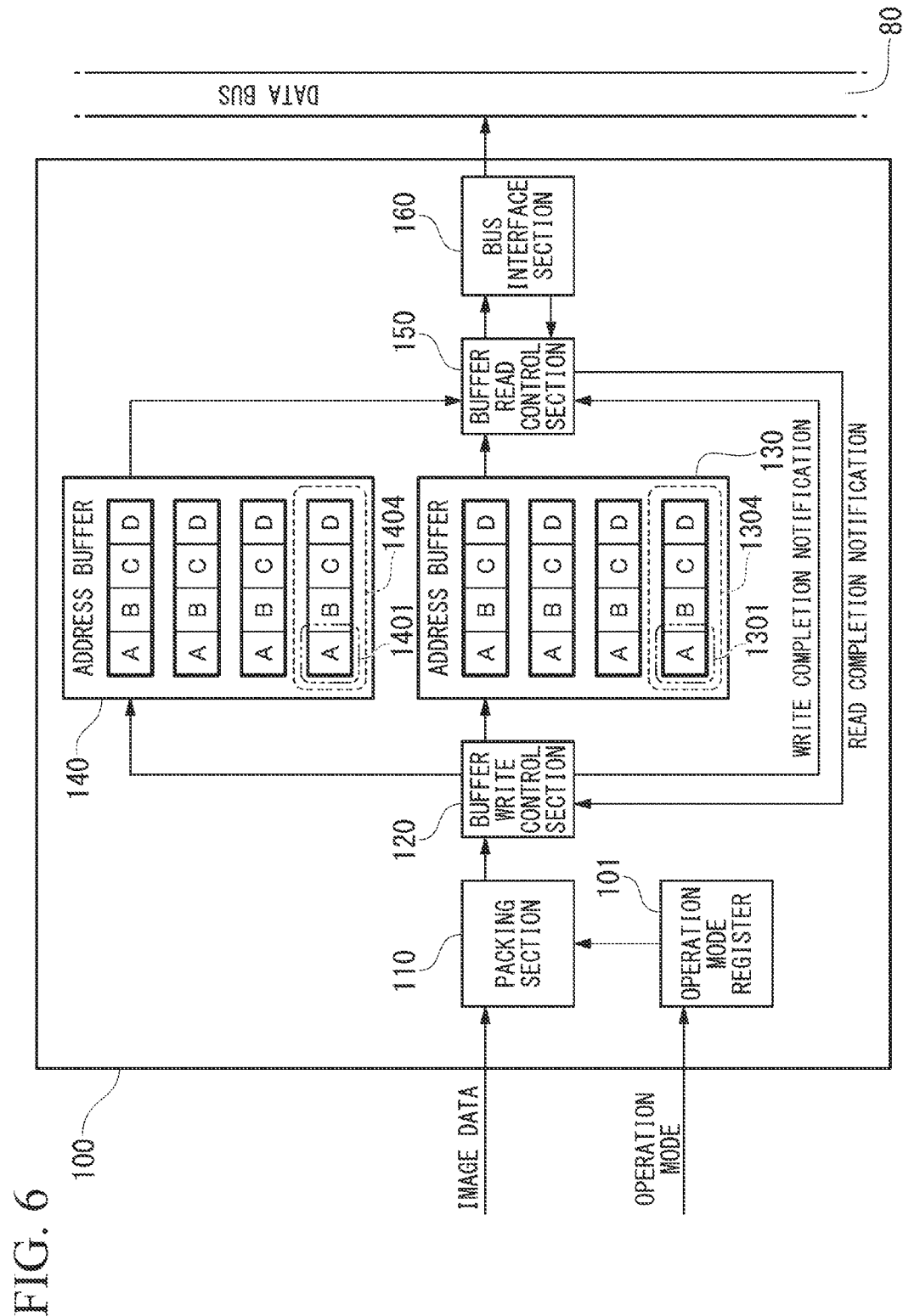
FIG. 6 is a block diagram schematically illustrating a configuration of a data transfer control device provided in the image-processing apparatus according to the present embodiment.

FIG. 6 is a block diagram schematically illustrating a configuration of the data transfer control device 100 provided in the image-processing apparatus 1 according to the present embodiment. As shown in FIG. 6, the data transfer control device 100 includes an operation mode register 101, a packing section 110, a buffer write control section 120, a data buffer 130, an address buffer 140, a buffer read control section 150, and a bus interface section 160.

The data transfer control device 100 outputs a DMA request signal for transferring (writing) the image data to the DRAM 72 through the data bus 80, to the bus arbiter 70 through the data bus 80. Here, the data transfer control device 100 collects plural pieces of image data to be transferred to the DRAM 72 so that the bank order for access to the DRAM 72 is continuous in a predetermined order, and then, outputs the DMA request signal to the bus arbiter 70. Further, after the DAM request is received in the bus arbiter 70 and a DMA reception signal is input, the data transfer control device 100 outputs the collected image data to the bus arbiter 70 through the data bus 80 so that the collected image data is continuous in a predetermined bank order. Thus, the bus arbiter 70 and the DRAM interface section 71 operate based on the DMA from the data transfer control device 100, so that the image data output from the data transfer control device 100 is written in storage regions corresponding to addresses of the DRAM 72 designated in the data transfer control device 100.

In the following description, a case where an address space of the DRAM 72 that is a destination to which the data transfer control device 100 transfers the image data is formed by four banks (bank A, bank B, bank C and bank D) will be described. Further, in the following description, a case where a bank interleaving access for performing continuous accesses to the respective four banks of the DRAM 72 at one time by one-time DMA from the data transfer control device 100 is performed, that is, a case where the continuous accesses to the four banks of the DRAM 72 are performed in the unit of one-time DMA transfer, will be described.

In the operation mode register 101, information relating to an operation when the data transfer control device 100 accesses the DRAM 72 by the DMA, that is, operation mode information is set. For example, the operation mode information includes information for exchanging the access order to the respective banks of the DRAM 72, information for exchanging the order of the image data when the input image data is collected (packed) in a predetermined unit information for exchanging the generation order of the addresses of the DRAM 72 in a horizontal direction and in a vertical direction, and the like. Further, the operation mode register 101 outputs the set operation mode information to the packing section 110.

For example, the operation mode register 101 outputs information about operation modes in the inversion process such as non-inversion, horizontal inversion, vertical inversion and horizontal and vertical inversion to the packing section 110.

The setting of the operation mode information to the operation mode register 101 is performed in advance by the CPU 60 before the data transfer control device 100 starts the transfer of the image data using the DMA, for example. For example, when the inversion process of the "non-inversion" is set as the operation mode, the image data packing order is set to the ascending order, and the address generation order of the DRAM 72 is set to the ascending order in the horizontal direction and to the ascending order in the vertical direction. In this operation mode, the bank access order becomes the ascending order. Further, for example, when the inversion process of the "horizontal inversion" is set as the operation mode, the image data packing order is set to the descending order, and the address generation order of the DRAM 72 is set to the descending order in the horizontal direction and to the ascending order in the vertical direction. In this operation mode, the bank access order becomes the descending order. Further, for example, when the inversion process of the "vertical inversion" is set as the operation mode, the image data packing order is set to the ascending order, and the address generation order of the DRAM 72 is set to the ascending order in the horizontal direction and to the descending order in the vertical order. In this operation mode, the bank access order becomes the ascending order. Further, for example, when the inversion process of the "horizontal and vertical inversion" is set as the operation mode, the image data packing order is set to the descending order, and the address generation order of the DRAM 72 is set to the descending order in the horizontal direction and to the descending order in the vertical order. In this operation mode, the bank access order becomes the descending order.

The packing section 110 collects (packs) the image data sequentially input based on the operation mode information input from the operation mode register 101 in a unit according to a bus width of the data bus 80, and outputs the packed image data to the buffer write control section 120. For example, when the image data is 8 bits and the bus width of the data bus 80 is 32 bits, the packing section 110 packs the sequentially input four pieces of image data to form 32-bit image data, and outputs the packed 32-bit image data to the buffet write control section 120. Here, when the operation mode information input from the operation mode register 101 is the "non-inversion", since the image data packing order is the ascending order, the sequentially input four pieces of image data are packed from a lower-order bit to form 32-bit image data, for example. Further, when the operation mode information input from the operation mode register 101 is the "horizontal inversion", since the image data packing order is the descending order, the sequentially input four pieces of image data are packed from a higher-order bit to form 32-bit image data, for example.

Further, the packing section 110 generates addresses of the DRAM 72 to which the packed image data is to be transferred based on the operation mode information input from the operation mode register 101, and outputs the generated addresses to the buffer write control section 120. For example, when the operation mode information input from the operation mode register 101 is the "non-inversion", since the bank access order is the ascending order and the address generation order of the DRAM 72 is the ascending order in the horizontal direction and the ascending order in the vertical direction, the packing section 110 generates addresses for designating the banks to which the packed 32-bit image data is to be transferred in the ascending order and designating the storage regions of the DRAM 72 in the ascending order in the horizontal direction and in the ascending order in the vertical direction. Further, for example, when the operation mode information input from the operation mode register 101 is the "horizontal inversion", since the bank access order is the ascending order and the address generation order of the DRAM 72 is the descending order in the horizontal direction and the ascending order in the vertical direction, the packing section 110 generates addresses for designating the banks to which the packed 32-bit image data is to be transferred in the descending order and designating the storage regions of the DRAM 72 in the descending order in the horizontal direction and in the ascending order in the vertical direction.

The buffer write control section 120 sequentially stores the packed image data input from the packing section 110 in the data buffer 130 and sequentially stores the addresses input from the packing section 110 in the address buffer 140, respectively. Further, if the storage of the image data and the addresses of amounts to be transferred to the DRAM 72 by the one-time DMA in the data buffer 130 and the address buffer 140 is completed, the buffer write control section 120 outputs a write completion notification indicating that the storage of the image data and the addresses in the data buffer 130 and the address buffer 140 is completed, that is, indicating that the preparation for the one-time DMA is finished, to the buffer read control section 150. In the following description, the image data and the addresses transferred by the one-time DMA is collectively referred to as "one transfer unit data".

Further, if a read completion notification indicating that reading of the one transfer unit data respectively stored in the data buffer 130 and the address buffer 140 is completed is input from the buffer read control section 150, the buffer write control section 120 determines that there is a space in the storage regions of the data buffer 130 and the address buffer 140, and starts storage of the next one transfer unit data.

The data buffer (buffer section) 130 is a storage section, for example, configured by a static random access memory (SRAM) or the like that temporarily stores plural pieces of packed image data that are sequentially input from the buffer write control section 120 under the control of the buffer write control section 120. The data buffer 130 includes storage regions 1301 that stores plural pieces of image data to be transferred to the corresponding banks of the DRAM 72, in which the number of the storage regions 1301 correspond to the number of the banks included in the DRAM 72. For example, the data buffer 130 includes the storage regions 1301 having a storage capacity that stores 16 pieces of packed 32-bit image data input from the buffer write control section 120, that is, the storage regions 1301 of 64 bytes corresponding to four banks included in the DRAM 72. Further, the data buffer 130 sequentially outputs the image data stored in the storage regions 13101 to the buffer read control section 150 under the control of the buffer read control section 150.

In the configuration of the data transfer control device 100 shown in FIG. 6, four storage region groups 1304 in which four storage regions 1301 are included as a set are provided. Further, in the data transfer control device 100, the transfer of all the image data stored in the storage region group 1304 is performed in one-time DMA transfer unit. With such a configuration, the data transfer control device 100 can perform the DMA for continuously performing a burst transfer for continuous transfer of 16 pieces of 32-bit image data to the respective banks of the DRAM 72 with respect to four banks, four times. Further, signs written in the respective storage regions 1301 represent the banks of the DRAM 72 corresponding to the respective storage regions 1301.

In the present embodiment, a timing when the image data is written to the data buffer 130 and a timing when the image data is read from the data buffer 130 are not particularly limited. Accordingly, the data buffer 130 may be the SRAM in which the data writing timing and the data reading timing are controllable at different timings. That is, an operation clock of the buffer write control section 120 and an operation clock of the buffer read control section 150 may be different from each other, and thus, a write clock that corresponds to the timing when the image data is written to the data buffer 130 and a read clock that corresponds to the timing when the image data is read from the data buffer 130 may be different from each other.

The address buffer (buffer section) 140 is a storage section having the same configuration as that of the buffer 130, which temporarily stores the addresses of the DRAM 72 input from the buffer write control section 120 under the control of the buffer write control section 120. That is, the address buffer 140 is a storage section that stores addresses for designating the banks of the DRAM 72 that is a destination to which the image data stored in the data buffer 130 is to be transferred (written). The address buffer 140 includes storage regions 1401 corresponding to the respective storage regions 1301 in the data buffer 130, in which the number of the storage regions 1401 is the same as in the data buffer 130. Here, the storage capacity of the storage region 1401 is not limited to the same storage capacity as that of the storage region 1301 in the data buffer 130, and corresponds to a storage capacity necessary for storage of addresses to be designated when the image data stored in she storage region 1301 is transferred to the DRAM 72. Further, the address buffer 140 outputs the addresses stored in the storage region 1401 to the buffer read control section 150 under the control of the buffer read control section 150.

In the configuration of the data transfer control device 100 shown in FIG. 6, similarly to the data buffer 130 four storage region groups 1401 in which four storage regions 1401 are included as a set are provided. Further, signs written in the respective storage regions 1401 represent banks of the DRAM 72 corresponding to the respective storage regions 1401.

In the present embodiment, a timing when the image data is written to the address buffer 140 and a timing when the image data is read from the address buffer 140 are not particularly limited. Accordingly, the data buffer 130 and the address buffer 140 may not necessarily be configured by individual buffers, and may be configured by providing a data buffer region and an address buffer region in different storage regions of the same SRAM.

If a write completion notification is input from the buffer write control section 120, the buffer read control section 150 determines that the storage of the one transfer unit data is completed in the storage regions of the data buffer 130 and the address buffer 140, and sequentially reads the packed image data stored in the data buffer 130 and the addresses stored in the address buffer 140. Further, the buffer read control section 150 outputs the read image data and addresses to the bus interface section 160.

Further, if the reading of the image data and the addresses of amounts to be transferred to the DRAM 72 by the one-time DMA from the data buffer 130 and the address buffer 140 is completed, the buffer read control section 150 outputs a read completion notification indicating that the reading of the image data and the addresses from the data buffer 130 and the address buffer 140, that is, the reading of the one transfer unit data is completed to the buffer write control section 120. Thus, the buffer read control section 130 notifies the buffer write control section 120 that there is a space in the storage regions of the data buffer 130 and the address buffer 140.

The bus interface section 160 communicates (interfaces) the image data and the addresses input from the buffer read control section 150 based on a protocol of the DMA in the image-processing apparatus 1 between the bus arbiter 70 and the bus interface section 160. More specifically, the bus interface section 160 outputs a DMA request signal for accessing the DRAM 72 to the bus arbiter 70 through the data bus 80. Further, after the DMA request is received in the bus arbiter 70 and a DMA reception signal is input through the data bus 80, the bus interface section 160 outputs the image data and the addresses input from the buffer read control section 150 to the bus arbiter 70 through the data bus 80.

In the configuration of the data transfer control device 100 shown in FIG. 6 since the data buffer 130 and the address buffer 140 are provided with the storage regions capable of performing the DMA four times. It is possible to continuously perform the DMA four times between the bus arbiter 70 and the data transfer control device 100.

Next, the DMA operation performed by the data transfer control device 100 between the bus arbiter 70 and the data transfer control device 100 will be described. FIGS. 7A to 7D are diagrams illustrating an example of the DMA operation to the first exchange process of the data transfer control device 100 provided in the image-processing apparatus 1 according to the present embodiment. FIGS. 7A to 7D sequentially show, when the inversion process of the "non-inversion" is set as the operation mode when the image data is output, operations of the data transfer control device 100 for outputting the image data by the DMA, and show data paths in the operations. Further, FIGS. 7A to 7D show only components relating to the image data output in the components of the data transfer control device 100, for ease of description. In the following description, the data transfer control device 100 provided in the image transfer part 21 in the image-processing apparatus 1 will be described. Accordingly, the "image data" in the following description refers to the preprocessed image data output by the image transfer part 21.

First, the CPU 60 sets the inversion process of the "non-inversion" in the operation mode register 101 as the operation mode on a path C11 shown in FIG. 7A. Subsequently, if the image data (preprocessed image data) to be transferred to the respective banks of the DRAM 72 from the image transfer part 21 is input, the image data is packed by the packing section 110 and is then stored in the corresponding storage region 1301 of the data buffer 130 on a patch C12 shown in FIG. 7A. FIG. 7A shows a state where the image data of the bank A to which address 0 is allocated is stored in the corresponding storage region 1301 of the data buffer 130. Here, the address generated by the packing section 110 is stored in the corresponding storage region 1401 of the address buffer 140.

Similarly, if the image data (preprocessed image data) to be transferred to the respective banks of the DRAM 72 from the image transfer part 21 is input, each piece of image data is packed by the packing section 110 and is then stored in the corresponding storage region 1301 of the data buffer 130 on a path C13 shown in FIG. 7B. FIG. 7B shows a state where the image data of bank B to bank D to which address 1 to address 3 are allocated is stored in the corresponding storage regions 1301 of the data buffer 130. Here, the addresses generated by the packing section 110 are stored in the corresponding respective storage regions 1401 of the address buffer 140.

Subsequently, if the image data (preprocessed image data) to be transferred to the respective banks of the DRAM 72 is stored in four corresponding storage regions 1301 in the data buffer 130, that is, if one transfer unit data is stored in the corresponding storage region group 1304 in the data buffer 130, the buffer write control section 120 outputs the write completion notification indicating that the preparation for the one-time DMA is finished to the buffer read control section 150 on a path C14 shown in FIG. 7B.

Subsequently, if the write completion notification is input from the buffer write control section 120, in cooperation with the bus interface section 160, the buffer read control section 150 outputs the one transfer unit data stored in the data buffer 130 and the address buffer 140 to the bus arbiter 70 through the data bus 80, on a path C15 shown in FIG. 7C.

More specifically, first, the butter read control section 150 requests the bus interface section 160 to output a DMA request signal according to the write completion notification input from the buffer write control section 120. Thus, the bus interface section 160 outputs the DMA request signal for accessing the DRAM 72 to the bus arbiter 70 through the data bus 80.

Then, after the DMA request is received by the bus arbiter 70 and a DMA reception signal is input to the bus interface section 160 through the data bus 80, the bus interface section 160 outputs a signal indicating the start of reading each of the data buffer 130 and the address buffer 140 to the buffer read control section 150. Thus, the buffer read control section 150 sequentially reads the one transfer unit data stored in the data buffer 130 and the address buffer 140 and outputs the result to the bus interface section 160. Further, the bus interface section 160 sequentially outputs the one transfer unit data that are sequentially input from the buffer read control section 150 to the bus arbiter 70 through the data bus 80. Thus, the one transfer unit data is written in the storage region of the DRAM 72 corresponding to the designated address. FIG. 7C shows a state where the image data of the bank A to bank D to which address 0 to address 3 are allocated is sequentially output to the data bus 80.

Then, if the reading of the one transfer unit data stored in the data buffer 130 and the address buffer 140 is completed, the buffer read control section 150 outputs the read completion notification indicating that the reading of the one transfer unit data is completed to the buffer write control section 120 on a path C16 shown in FIG. 7C.

In the data transfer control device 100, as described above, each of the data buffer 130 and the address buffer 140 has the configuration capable of performing the DMA four times.

Thus, in the data transfer control device 100, even while the buffer read control section 150 and the bus interface section 160 are transferring in cooperation the image data of bank A to bank D to which address 0 to address 3 are allocated in the DMA, it is possible to store one transfer unit data to be transferred in the next DMA in the data buffer 130 and the address buffer 140, respectively.

More specifically, while the image data is being transferred in the DMA, even though the next image data (preprocessed image data) to be transferred to the respective banks of the DRAM 72 from the image transfer part 21 is input on a path C17 shown in FIG. 7D, each piece of image data packed by the packing section 110 can be stored in the corresponding storage region 1301 of the data buffer 130. FIG. 7D shows a state where the image data (image data transferred in the second DMA) of the bank A and bank D to which address 4 to address 7 are altered and the image data (image data transferred in the third DMA) of the bank A to bank D to which address 8 to address 11 are allocated are stored in the corresponding storage regions 1301 of the data buffer 130. Here, the addresses generated by the packing section 110 are stored in the corresponding respective storage regions 1401 of the address buffer 140.

Further, the buffer write control section 120 outputs the write completion notification to the buffer read control section 150 on a path C18 shown in FIG. 7D, whenever one transfer unit data to be transferred to the respective banks of the DRAM 72 is stored in the corresponding storage region group 1304 in the data buffer 130. Thus, after the DMA transfer of the image data of bank A to bank D to which address 0 to address 3 are allocated is completed, subsequently, the data transfer control device 100 can sequentially perform the second DMA transfer and the third DMA transfer in cooperation with the buffer read control section 150 and the bus interface section 160.

Figure 8:
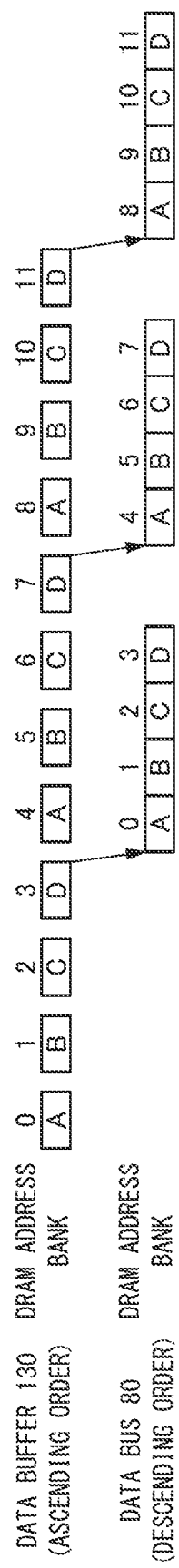
FIG. 8 is a diagram schematically illustrating an example of transfer timing of image data in the DMA operation in the first exchange process of the data transfer control device provided in the image-processing apparatus according to the present embodiment.

FIG. 8 is a diagram schematically illustrating an example of a transfer timing of the image data in the DMA operation in the first exchange process of the data transfer control device 100 provided in the image-processing apparatus 1 according to the present embodiment. FIG. 8 shows timings of the usage data stored in the data buffer 130 and the image data output to the data bus 80 in the DMA operation shown in FIGS. 7A to 7D.

As described above, the data transfer control device 100 performs the bank interleaving access for performing the continuous accesses to the respective four banks of the DRAM 72 at one time, by the one-time DMA transfer. In the DMA operation shown in FIGS. 7A to 7D, the inversion process is not performed. Thus, in the data buffer 130 of the data transfer control device 100, the image data of the respective banks to which the addresses of the DRAM 72 are allocated in the ascending order is stored without performing the inversion process. Further, the buffer read control section 150 and the bus interface section 160 in the data transfer control device 100 output the image data stored in the data buffer 130 to the data bus 80 in the order of bank A, bank B, bank C and bank D to which the addresses of the DRAM 72 are allocated in the ascending order whenever the image data to be transferred to bank A to bank D of the DRAM 72 is arranged.

More specifically, as shown in FIG. 8, the data transfer control device 100 stores the image data of bank A to bank D to which address 0 to address 3 are allocated in the ascending order in the data buffer 130, and then sequentially outputs the image data of bank A to bank D to which address 0 to address 3 are allocated to the data bus 80. Then, as shown in FIG. 8, the data transfer control device 100 stores the image data of bank A to bank D to which address 4 to address 7 are allocated in the ascending order in the data buffer 130, and then sequentially outputs the image data of bank A to bank D to which address 4 to address 7 are allocated to the data bus 80. Then, as shown in FIG. 8, the data transfer control device 100 stores the image data of bank A to bank D to which address 8 to address 11 are allocated in the ascending order in the data buffer 130, and then sequentially outputs the image data of bank A to bank D to which address 8 to address 11 are allocated to the data bus 80.

Next, another operation of the DMA performed by the data transfer control device 100 between the bus arbiter 70 and the data transfer control device 100 will be described. FIGS. 9A to 9D are diagrams illustrating another example of the DMA operation in the first exchange process of the data transfer control device 100 provided to the image-processing apparatus 1 according to the present embodiment. FIGS. 9A to 9D sequentially show, when the inversion process of the "horizontal inversion" is set as the operation mode when the image data is output, operations of the data transfer control device 100 for outputting the image data by the DMA, and show data paths in the operations. Further, similarly to the DMA operation shown in FIGS. 7A to 7D, FIGS. 9A to 9D show only components relating to the image data output to the components of the data transfer control device 100, for ease of description. In the following description, similarly to the DMA operation shown in FIGS. 7A to 7D, the data transfer control device 100 provided in the image transfer part 21 to the image-processing apparatus 1 will be described.

First, the CPU 60 sets the inversion process of the "horizontal inversion" in the operation mode register 101 as the operation mode on a path C21 shown in FIG. 9A. Subsequently, if the image data (preprocessed image data) to be transferred to the respective banks of the DRAM 72 from the image transfer part 21 is input, the image data is packed by the packing section 110 and is then stored in the corresponding storage region 1301 of the data buffer 130 on a path C22 shown in FIG. 9A. FIG. 9A shows a state where the image data of bank D to which address 11 is allocated is stored in the corresponding storage region 1301 of the data buffer 130. Here, the address generated by the packing section 110 is stored in the corresponding storage region 1401 of the address buffer 140.

Similarly, if the image data (preprocessed image data) to be transferred to the respective banks of the DRAM 72 from the image transfer part 21 is input, each piece of image data is packed by the packing section 110 and is then stored in the corresponding storage region 1301 of the data buffer 130 on a path C23 shown in FIG. 9B. FIG. 9B shows a state where the image data of bank C to bank A to which address 10 to address 8 are allocated is stored in the corresponding storage regions 1301 of the data buffer 130. Here, the addresses generated by the package section 110 are stored in the corresponding respective storage regions 1401 of the address buffer 140.

Subsequently, if the image data (preprocessed image data) to be transferred to the respective banks of the DRAM 72 is stored in four corresponding storage regions 1301 in the data buffer 130, that is, if one transfer unit data is stored in the corresponding storage region group 1304 in the data buffer 130, the buffer write control section 120 outputs the write completion notification to the buffer read control section 150 on a path C24 shown in FIG. 9B, similarly to the DMA operation shown in FIGS. 7A to 7D.

Subsequently, if the write completion notification is input from the buffer write control section 120, similarly to the DMA operation shown in FIGS. 7A to 7D, in cooperation with the bus interface section 160, the buffer read control section 150 outputs the one transfer unit data stored in the data buffer 130 and the address buffer 140 to the bus arbiter 70 through the data bus 80, on a path C25 shown in FIG. 9C.

More specifically, first, the buffer read control section 150 requests the bus interface section 160 to output a DMA request signal according to the write completion notification input from the buffer write control section 120, and the bus interface section 160 outputs the DMA request signal for accessing the DRAM 72 to the bus arbiter 70 through the data bus 80. Then, after the DMA request is received by the bus arbiter 70 and a DMA reception signal is input to the bus interface section 160, the bus interface section 160 outputs a signal indicating the start of reading the one transfer unit data to the buffer read control section 150. Then, the buffer read control section 150 sequentially reads the one transfer unit data stored in the data buffer 130 and the address buffer 140 and outputs the result to the bus interface section 160. Further, the bus interface section 160 sequentially outputs the one transfer unit data that is sequentially input from the buffer read control section 150 to the bus arbiter 70 through the data bus 80. Thus, the one transfer unit data is written in the storage region of the DRAM 72 corresponding to the designated address. FIG. 9C shows a state where the image data of bank A to bank D to which address 8 to address 11 are allocated is sequentially output to the data bus 80.

Here, as understood from FIGS. 9A to 9D, the image data stored in the data buffer 130 on the path C22 shown in FIG. 9A and the path C23 shown in FIG. 9B is the image data of bank D to bank A to which the addresses of the DRAM 72 are allocated in the descending order, that is, address 11, address 10, address 9 and address 8 are sequentially allocated. Further, the buffer read control section 150 sequentially reads the image data stored in the data buffer 130 on the path C25 shown in FIG. 9C in the ascending order, that is, in the order of address 8, address 9, address 10 and address 11, and outputs the result to the bus interface section 160. As described above, the data transfer control device 100 reverses the order that the image data is stated in the data buffer 130 and the order that the image data is read from the data buffer 130, to thereby perform the inversion process of the image data.

Then, if the reading of the one transfer unit data stored in the data buffer 130 and the address buffer 140 is completed, the buffer read control section 150 outputs the read completion notification to the buffer write control section 120 on a path C26 shown in FIG. 9C, similarly to the DMA operation shown in FIGS. 7A to 7D.

In the data transfer control device 100, similarly to the DMA operation shown in FIGS. 7A to 7D, even while the buffer read control section 150 and the bus interface section 160 are transferring in cooperation the image data of bank A to bank D to which address 8 to address 11 are allocated in the DMA, it is possible to store one transfer unit data to be transferred in the next DMA in the data buffer 130 and the address buffer 140, respectively.

More specifically, while the image data is being transferred in the DMA, even though the next image data (preprocessed image data) to be transferred to the respective banks of the DRAM 72 from the image transfer part 21 is input on a path C27 shown in FIG. 9D, each piece of image data packed by the packing section 110 can be stored in the corresponding storage region 1301 of the data buffer 130. FIG. 9D shows a state where the image data (image data transferred in the second DMA) of bank D to bank A to which address 7 to address 4 are allocated and the image data (image data transferred in the third DMA) of bank D to bank A to which address 3 to address 0 are allocated are stored in the corresponding storage regions 1301 of the data buffer 130. Here, the addresses generated by the packing section 110 are stored in the corresponding respective storage regions 1401 of the address buffer 140.

Further, the buffer write control section 120 outputs the write completion notification to the buffer read control section 150 on a path C28 shown in FIG. 9D, whenever one transfer unit data to be transferred to the respective banks of the DRAM 72 is stored in the corresponding storage region group 1304 in the data buffer 130, similarly to the DMA operation shown in FIGS. 7A to 7D. Thus, after the DMA transfer of the image data of bank A to bank D so which address 8 to address 11 are allocated is completed, subsequently, the data transfer control device 100 can sequentially perform the second DMA transfer and the third DMA transfer in cooperation with the buffer read control section 150 and the bus interface section 160.

Figure 10:
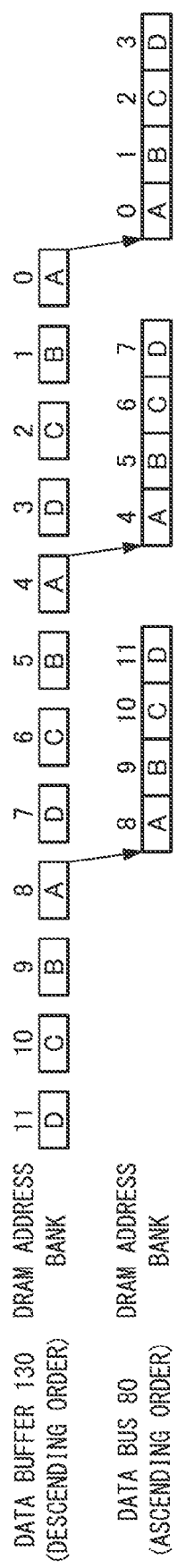
FIG. 10 is a diagram schematically illustrating an example of transfer timing of image data in another example of the DMA operation in the first exchange process of the data transfer control device provided in the image-processing apparatus according to the present embodiment.

FIG. 10 is a diagram schematically illustrating an example of a transfer timing of the image data in another example of the DMA operation in the first exchange process of the data transfer control device 100 provided in the image-processing apparatus 1 according to the present embodiment. FIG. 10 shows timings of the image data stored in the data buffer 130 and the image data output to the data bus 80 in the other DMA operation shown in FIGS. 9A to 9D.

Similarly to the DMA operation shown in FIGS. 7A to 7D, the data transfer control device 100 performs the bank interleaving access for performing continuous accesses to the respective four banks of the DRAM 72 at one time, by the one-time DMA transfer. In the other DMA operation shown in FIGS. 9A to 9D, the inversion process of the horizontal in version is performed. Thus, in the data buffer 130 of the data transfer control device 100, the image data of the respective banks to which the addresses of the DRAM 72 are allocated in the descending order is stored in a reverse order to the order of the operation shown in FIGS. 7A to 7D. Further, the buffer read control section 150 and the bus interface section 160 in the data transfer control device 100 output the image data stored in the data buffer 130 to the data bus 80 in the order of bank A, bank B, bank C and bank D to which the addresses of the DRAM 72 are allocated in the Ascending order, similarly to the DMA operations shown in FIGS. 7A to 7D, whenever the image data to be transferred to bank A to bank D of the DRAM 72 is arranged.

More specifically, as shown in FIG. 10, the data transfer control device 100 stores the image data of bank D to bank A to which address 11 to address 8 are allocated to the descending order in the data buffer 130, and then reads in the descending order the image data of bank A to bank D to which address 8 to address 11 are allocated, and sequentially outputs the result to the data bus 80. Then, as shown in FIG. 10, the data transfer control device 100 stores the image data of bank D to bank A to which address 7 to address 4 are allocated in the descending order in the data buffer 130, and then, reads in the descending order the image data of bank A to bank D to which address 4 to address 7 are allocated, and sequentially outputs the result to the data bus 80. Further, as shown in FIG. 10, the data transfer control device 100 stores the image data of bank D to bank A to which address 3 to address 0 are allocated in the descending order in the data buffer 130, and then reads in the descending order the image data of bank A to bank D to which address 0 to address 3 are allocated, and sequentially outputs the result to the data bus 80.

In this way, the data transfer control device 100 stores the image data in the reverse order when storing the image data in the data buffer 130, and reads the image data from the data buffer 130 in the same order regardless of whether to perform the inversion process, to thereby perform the inversion process of the image data.

As described above, the data transfer control device 100 changes the order of the image data when, being stored in the data buffer 130 according to the operation mode information set in the operation mode register 101 to exchange the order of the image data to be output to the bus arbiter 70 through the data bus 80 in the DMA transfer, to thereby perform the image inversion process. Thus, the bank orders when the respective processing blocks provided in the image-processing apparatus 1 access the DRAM 72 are the same in all the processing blocks in the image-processing apparatus 1. Thus, even in a case where a processing block that does not perform the inversion process and a processing block that performs the inversion process in the image-processing apparatus 1 are present together and the plural processing blocks access the DRAM 72, it is possible to avoid the continuous access to the same bank of the DRAM 72 due to the bank interleaving, and to suppress reduction in the access efficiency to the DRAM 72 due to the time loss.

In the example of the DMA operation in the data transfer control device 100 shown in FIGS. 7A to 7D to FIG. 10, as shown in FIG. 11, a case where the banks of the DRAM 72 corresponding to the respective storage regions 1301 in the data buffer 130 and the respective storage regions 1401 in the address buffer 140 are determined in advance, that is, the corresponding banks are fixed and the image data and the addresses of the respective banks are stored in the corresponding storage regions 1301 and the storage regions 1401 has been described. In this way, by determining in advance the banks of the DRAM 72 corresponding to the respective storage regions 1301 in the data buffer 130 and the respective storage regions 1401 in the address buffer 140, even in a case where the image data of the respective banks is input to the data transfer control device 100 in any order, it is possible to output the stored image data to the DRAM 72 in the same bank order.

More specifically, in the example of the DMA operation in the data transfer control device 100 shown in FIGS. 7A to 7D and FIG. 8, for example, as shown in FIG. 11B, a case where the image data input in the order of bank A, bank B, bank C and bank D is output to the DRAM 72 in the order of bank A, bank B, bank C and bank D without exchanging the order has been described. Further, in the example of the DMA operation in the data transfer control device 100 shown in FIGS. 9A to 9D and FIG. 10, for example, as shown in FIG. 11C, a case where the image data input in the order of bank D, bank C, bank B and bank A is output to the DRAM 72 in the order of bank A, bank B, bank C and bank D by reversely exchanging the order has been described. However, by determining in advance the banks of the DRAM 72 corresponding to the respective storage regions 1301 in the data buffer 130 and the respective storage regions 1401 in the address buffer 140, even in a case where the image data is input in an order other than the reverse order, it is possible to output the image data to the DRAM 72 in the same order. For example, as shown in FIG. 11D, even in a case where the image data is input to the data transfer control device 100 in the order of bank D, bank B, bank C and bank A, by storing the image data in the corresponding storage regions 1301, respectively, and by reading the stored image data in the same order, it is possible to output the image data to the DRAM 72 in the order of bank A, bank B, bank C and bank D.

Further, in the example of the DMA operation in the data transfer control device 100 shown in FIGS. 7A to 7D to FIG. 10, a case where one piece of image data corresponding to each of bank A, bank B, bank C and bank D is necessarily included in the one transfer unit data has been described. However, the image data input to the data transfer control device 100 is not limited to the case where the image data corresponding to each of bank A, bank B, bank C and bank D is necessarily included therein. In this case, it is possible to appropriately change the banks corresponding to the storage region 1301 and the storage region 1401. For example, it is possible to store image data corresponding to different banks in the storage region 1301 in the data buffer 130 and the storage region 101 in the address buffer 140. For example, a case where the image data input in the order of bank A, bank B, bank C and bank D is stored in the same storage region group 1304 in the data buffer 130 may be considered. In this case, the change may be performed so that the image data of the first bank A is stored in the storage region 1301 corresponding to bank A, the image data of the first bank B is stored in the storage region 1301 corresponding to bank B, the image data of the second bank A is stored in the storage region 1301 corresponding to bank C and the image data of the second bank B is stored in the storage region 1301 corresponding to bank D, respectively.

Second Exchange Process

Figures 13A, 13B, 13C:
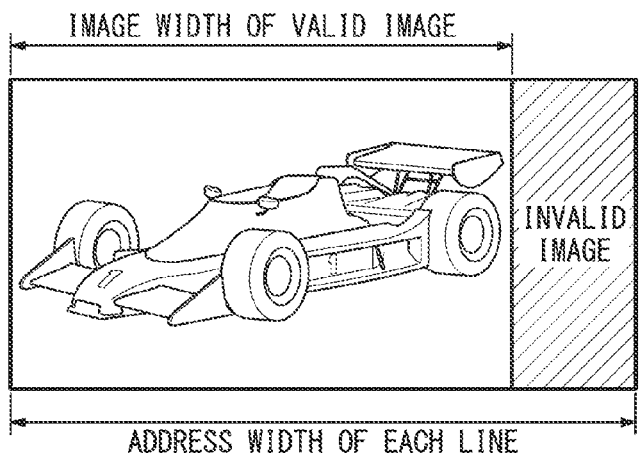
FIG. 13A is a diagram schematically illustrating an example of the access of image data to the DRAM corresponding to a case where the transfer direction of the image data is different in the image-processing apparatus according to the present embodiment.
FIG. 13B is a diagram schematically illustrating an example of the access of image data to the DRAM corresponding to a case where the transfer direction of the image data is different in the image-processing apparatus according to the present embodiment.
FIG. 13C is a diagram schematically illustrating an example of the access of image data to the DRAM corresponding to a case where the transfer direction of the image data is different in the image-processing apparatus according to the present embodiment.

Next, in order to describe another method for access to the DRAM 72 in each processing block of the image-processing apparatus 1, an example of an operation of the image-processing apparatus 1 will be described with reference to FIGS. 12A to 12C, and FIGS. 13A and 13C. FIG. 12A is a diagram schematically illustrating an example of a transfer direction of image data in the image-processing apparatus 1 according to the present embodiment. FIG. 12B is a diagram schematically illustrating an example of an access to the DRAM 72 in the image-processing apparatus 1 according to the present embodiment. Further, FIGS. 13A and 13C are diagrams schematically illustrating an example of an access to the DRAM 72 corresponding to a case where the transfer direction of the image data is different in the image-processing apparatus 1 according to the present embodiment.

In the image-processing apparatus 1, there is a case where a direction where the image sensor 10 obtains an image and a direction where the image-processing section 30 processes the image are different from each other. For example, as shown in FIG. 12A, as the image sensor 10 performs raster scanning with respect to pixels to sequentially output image data input in the horizontal direction (transverse direction) with respect to the image, the preprocessing section 20 transfers (writes) the preprocessed image data to the DRAM 72 in the horizontal direction (transverse direction) with respect to the image. Further, there is a case where the image-processing section 30 divides the image into blocks having a predetermined size and obtains (reads) the preprocessed image data from the DRAM 72 in the vertical direction (longitudinal direction) in the respective blocks.

Here, it may be considered that each piece of the progressed image data is stored in the DRAM 72, for example, as shown in FIG. 12B. FIG. 12B shows a state where the preprocessed image data to which addresses are sequentially allocated in the ascending order from the left side, in respective lines of the image and to which addresses are sequentially allocated in the ascending order from the upper side of the image is stored in the storage regions of the corresponding respective banks of the DRAM 72.

In this case, as shown in FIG. 12C, the data transfer control device 100 provided in the image transfer part 21 in the image-processing apparatus 1 continuously accesses different banks of the DRAM 72 to transfer the preprocessed image data to the DRAM 72, but it is necessary that the data transfer control device 200 provided in the image-processing section 30 continuously access the same bank of the DRAM 72 to obtain the preprocessed image data from the DRAM 72. Thus, due to this reason, a large time loss occurs in the continuous access to the same bank of the DRAM 72 from the data transfer control device 200 (See FIG. 12C).

Thus, as shown in FIG. 13A, a method of adding an invalid image data region (invalid region) on the right side of a valid image data (valid image) and performing a control so that the width of the image in the horizontal direction (transverse direction) is larger than the width of the valid image in the horizontal direction (transverse direction) may be considered. Using this method, the width of addresses allocated in each line of the image, that is, the difference between the first address and the last address in each line may become larger than the width of the addresses allocated in each line of the valid image by the method.

Further, by adjusting the setting of the size of the invalid region, that is, the width of the addresses of the invalid region, it is possible to change the banks of the DRAM 72 to be continuously accessed from the data transfer control device 200 provided in the image-processing section 30 when obtaining the preprocessed image data in the vertical direction (longitudinal direction) to different banks. FIG. 13B shows a state where, when the size of the invalid region in the horizontal direction (transverse direction) is set to the same size of the banks of the DRAM 72, the preprocessed image data disposed at the same position in the vertical direction (longitudinal direction) in the valid image is stored to the different banks of the DRAM 72.

In this case, as shown in FIG. 13, the data transfer control device 100 provided in the image transfer part 21 in the image-processing apparatus 1 continuously accesses the different banks of the DRAM 72 to transfer the preprocessed image data to the DRAM 72, and also, the data transfer control device 200 provided in the image-processing section 30 continuously accesses the different banks of the DRAM 72 to obtain the preprocessed image data from the DRAM 72. In this way, by adding the invalid region on the right side of the valid image region, it is possible to avoid the continuous access to the same bank of the DRAM 72 (see FIG. 13C).

However, even with the method of adding the invalid region on the right side of the valid image region, it is difficult to entirely avoid the continuous access to the same bank of the DRAM 72. For example, there is a case the image-processing apparatus 1 obtains (reads) the display image data using the data transfer control device 200 provided in the display processing section 40, in parallel with the transfer (writing) of the preprocessed image data using the data transfer control device 100 provided in the image transfer part 21 in the image-processing apparatus 1 and the obtainment (reading) of the preprocessed image data using the data transfer control device 200 provided in the image-processing section 30.

FIG. 14 is a diagram schematically illustrating an example of a time loss due to the bank access to the DRAM in the processing block provided in the image-processing apparatus 1 according to the present embodiment. FIG. 14 shows a timing in a case where the data transfer control device 100 provided in the image transfer part 21 transfers the preprocessed image data to the DRAM 72 when the data transfer control device 200 provided in the display processing section 40 obtains the display image data from the DRAM 72.

As shown in FIG. 14, if the image transfer part 21 and the display processing section 40 alternately perform the access to the DRAM 72, when the processing block that accesses the DRAM 72 is exchanged, continuous access to the same bank of the DRAM 72 is generated. More specifically, the data transfer control device 200 provided in the display processing section 40 accesses the respective banks of the DRAM 72 to the order of bank A, bank B, bank C and bank D to obtain the display image data, and then, the data transfer control device too provided to the image transfer part 21 accesses the respective banks of the DRAM 72 in the order of bank D, bank A, bank B and bank C to transfer the preprocessed image data on the fourth line. Thus, the access to the bank D from the data transfer control device 200 provided in the display processing section 40 and the access to the bank D from the data transfer control device 100 provided in the image transfer part 21 are continuously performed. Here, since the DRAM 72 cannot receive the continuous access to the bank D, this period of time becomes the time loss, and the access efficiency to the DRAM 72 deteriorates.

Thus, the data transfer control device provided in each processing block exchanges the bank order when the corresponding processing block accesses the DRAM 72, to thereby avoid the continuous access to the same bank of the DRAM 72. FIG. 15 is a diagram schematically illustrating an example of avoiding the time loss due to the bank access to the DRAM 72 by a second exchange process of the processing block provided in the image-processing apparatus 1 according to the present embodiment. Similarly to the access to the banks of the DRAM 72 shown to FIG. 14, FIG. 15 shows a timing in a case where the data transfer control device 100 provided in the image transfer part 21 transfers the preprocessed image data to the DRAM 72 when the data transfer control device 200 provided in the display processing section 40 obtains the display image data from the DRAM 72.

As shown in FIG. 15, if the image transfer part 21 and the display processing section 40 alternately perform the access to the DRAM 72, similarly to the access to the banks of the DRAM 72 shown in FIG. 14, when the processing block that accesses the DRAM 72 is exchanged continuous access to the same bank of the DRAM 72 is Generated. However, in the bank access to the DRAM 72 shown in FIG. 15, the data transfer control device 100 provided in the image transfer part 21 exchanges the access order to the respective banks of the DRAM 72. Thus, the image transfer part 21 can avoid the continuous access to the same bank of the DRAM 72 due to the bank interleaving.

More specifically, similarly to the access to the banks of the DRAM 72 shown in FIG. 14, the data transfer control device 200 provided in the display processing section 40 accesses the respective banks of the DRAM 72 in the order of bank A, bank B, bank C and bank D to obtain the display image data, and then, the data transfer control device 100 provided in the image transfer part 21 accesses the respective banks of the DRAM 72 in the order of bank D, bank A, bank B and bank C to transfer the preprocessed image data on the fourth line. Thus, similarly to the access to the banks of the DRAM 72 shown in FIG. 14, the access to the bank D from the data transfer control device 200 provided in the display processing section 40 and the access to the bank D from the data transfer control device 100 provided in the image transfer part 21 are continuously performed. Here, the data transfer control device 100 provided in the image transfer part 21 exchanges the access order to the respective banks of the DRAM 72 in the same order of bank A, bank B, bank C and bank D as in the data transfer control device 200 provided in the display processing section 40. Thus, even in a case where the image transfer part 21 and the display processing section 40 alternately perform the access to the DRAM 72, it is possible to avoid the continuous access to the same bank of the DRAM 72.

Here, the operation mode information set at the operation mode register 101 of the data transfer control device too provided in the image transfer part 21 is different from the information about the setting of the inversion process, described in the first exchange process. More specifically, in the first exchange process, the bank access order, the image data packing order and the address generation order of the DRAM 72 in the horizontal direction and the vertical direction are respectively set in the ascending order or descending order, but in the second exchange process, a setting for exchanging the bank access order to the order of bank A, bank B, bank C and bank D from the order of bank D, bank A, bank B and bank C is performed.

As described above, the data transfer control device provided in each processing block in the image-processing apparatus 1 exchanges the bank order when the corresponding processing block accesses the DRAM 72 to become the same order as the bank order when the other processing block accesses the DRAM 72. Thus, the bank orders when the respective processing blocks access the DRAM 72 are the same in all the processing blocks in the image-processing apparatus 1. Thus, even in a case where plural processing blocks that access the banks of the DRAM 72 in different orders are present together in the image-processing apparatus 1 and the respective processing blocks access the DRAM 72 in parallel, continuous access to the same bank of the DRAM 72 due to the bank interleaving is not generated. Thus, it is possible to suppress reduction in the access efficiency to the DRAM 72 due to the time loss.

As the respective storage regions 1301 in the data buffer 130 and the respective storage regions 1401 in the address buffer 140 determine (fix) the corresponding banks of the DRAM 72 in advance, it is possible to easily exchange the bank order when assessing to the DRAM 72 even when the image data of the respective banks is input to the data transfer control device in any order. However, even when the respective storage regions 1301 in the data buffer 130 and the respective storage regions 1401 in the address buffer 140 do not determine (fix) the corresponding banks of the DRAM 72 in advance, for example, the buffer write control section 120 and the buffer read control section 150 may cooperate with each other, to thereby exchange the bank order.

As described above, according to the embodiment of the invention, the data transfer control device is provided in each processing block in the image-processing apparatus 1. Further, the data transfer control device changes the order of the data to be stored in each of the data buffer and the address buffer provided in the data transfer control device itself according to the operation mode information set in the operation mode register, to set the order of the DRAM banks to be accessed in the one-time DMA transfer to be the same as the order of the DRAM banks to be accessed by another processing block in the DRAM transfer. Thus, in the image-processing apparatus according to the embodiment of the invention, it is possible to set the bank order when the respective processing blocks to which the data transfer control device according to the present embodiment is applied access the DRAM to be the same in all the processing blocks in the image-processing apparatus. Accordingly, even in a case where plural processing blocks to which the data transfer control devices according to the present embodiment that access the banks of the DRAM in different orders are present together in the image forming apparatus according to the embodiment of the invention and the respective processing blocks access the DRAM in parallel, continuous access to the same bank of the DRAM due to the bank interleaving is not generated. Thus, it is possible to suppress reduction in the access efficiency to the DRAM due to the time loss for the continuous access to the same bank of the DRAM.

In the present embodiment, the configuration in which the data transfer control device is provided in all the processing blocks in the image-processing apparatus 1 has been described, but the processing blocks that include the data transfer control device are not limited to the configuration shown in the present embodiment. For example, the data transfer control device may be provided only in a part of the processing blocks of the image-processing apparatus 1. For example, the data transfer control device may be provided only in the image transfer part 21 or the display processing section 40 that performs the exchange of the order of the DRAM banks to be accessed in the DMA transfer. In this way, even in the configuration in which the data transfer control device is provided only in the part of the processing blocks of the image-processing apparatus 1, it is not necessary to change the communication (interface) between the processing blocks and the bus arbiter. This configuration is considered as advantageous compared with the related configuration in which the bus arbiter exchanges the access order to the banks of the DRAM so that the interface between the processing blocks and the bus arbiter is complicated and all the processing blocks including a processing block that does not exchange the access order to the banks of the DRAM has to handle the complicated interface.

Further, in the present embodiment, the configuration in which the data buffer 130 and the address buffer 140 are exclusive buffers that exchange the access bank order to the DRAM 72, provided in the data transfer control device 100, has been described. However, the configuration of the data buffer 130 and the address buffer 140 is not limited to the configuration shown in the present embodiment. For example, a configuration may be considered in which a buffer that temporarily stores data is provided in a general processing block that performs data output by the DMA transfer, as a configuration for reliably performing data transfer when the data bus is empty, even when the data transfer is waited due to congestion of the data bus. Further, for example, a configuration may be considered in which a buffer that temporarily stores data is provided in the general processing block that performs data output by the DMA transfer, as a configuration for exchanging, when an internal clock for data processing and a clock in a data bus are different from each other, the clocks. Accordingly, in a case where this idea of the invention is already applied to the processing blocks having the same configuration as in the data buffer 130 and the address buffer 140 in the data transfer control device 100 according to the present embodiment. It is possible to use the already provided buffer as the data buffer 130 and the address buffer 140 in the data transfer control device 100 according to the present embodiment. In this case, it is possible to improve the access efficiency to the DRAM without increasing a circuit size of the processing blocks.

This configuration is considered as advantageous compared with the related art configuration in which the buffer for exchanging the access order to the banks of the DRAM is mounted in the bus arbiter.

In the present embodiment, the configuration in which the storage region 1301 of the data buffer 130 and the storage region 1401 of the address buffer 140 that store the data and the addresses output by the DMA transfer are changed according to the operation mode information set in the operation mode register 101 has been described. That is, the configuration in which when the data and the addresses are stored in the data buffer 130 and the address buffer 140 provided in the data transfer control device 100, the bank access order to the DRAM 72 is exchanged has been described. However, the configuration of exchanging the bank access order to the DRAM 72 is not limited to the configuration shown in the present embodiment. For example, a configuration may be used in which the storage region 1301 of the data buffer 130 and the storage region 1401 of the address buffer 10 that read the data and the addresses output by the DMA transfer according to the operation mode information set in the operation mode register 101 are changed. That is, in the data transfer control device 100, when the data and the addresses stored in the data buffer 130 and the address buffer 140 are read to be output by the DMA, the bank access order to the DRAM 72 may be exchanged. In this case, the operation mode information output by the operation mode register 101 may be input to the buffer read control section 150, for example, and the buffer read control section 150 may control the reading of the data stored in the data buffer 130 and the addresses stored in the address buffer 140 according to the input operation mode information.

Further, in the present embodiment, the configuration in which the packing section 110 provided in the data transfer control device 100 packs the input image data and generates the addresses of the DRAM 72 to which the packed image data is to be transferred has been described. However, the configuration of generating the addresses of the DRAM 72 is not limited to the configuration shown in the present embodiment. For example, a configuration may be used in which the buffer read control section 150 or the bus interface section 160 generate the addresses of the DRAM 72 according to the operation mode information set in the operation mode register 101. In this case, the address buffer 140 way not be provided in the data transfer control device 100.

Further, in the present embodiment, the configuration in which the DRAM 72 that is the destination to which the data transfer control device 100 transfers the image data is formed by four banks (bank A, bank B, bank C and bank D) has been described, but the configuration of the banks in the DRAM is not limited to the configuration shown in the present embodiment. For example, a configuration to which the DRAM is formed by eight banks may be similarly used.

Further, in the present embodiment, the case where the bank interleaving access for performing the continuous accesses to the respective four banks of the DRAM 72 at one time by the one-time DMA from the data transfer control device 100 is performed, that is, the case where the continuous accesses to the four banks of the DRAM 72 are performed in the unit of one-time DMA transfer has been described, but the number of banks to be accessed, by the one-time DMA is not limited to the configuration shown in the present embodiment. For example, the access to one bank in the one-time DMA may be performed in the unit of one-time DMA transfer.

In the present embodiment, the case where the image-processing apparatus such as a still image camera is provided as the data-processing apparatus of the invention and the data transfer control device of the invention is applied to the data-processing apparatus has been described. However, the system of the data-processing apparatus to which the data transfer control device according to the present embodiment may be applied is not limited to the embodiments of the invention. That is, the data transfer control device may be similarly applied to any system as long as it is a system of a data-processing apparatus in which plural processing blocks connected to a data bus sequentially access different banks of one DRAM shared by bank interleaving.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A data-processing apparatus comprising:
a plurality of processing blocks which are connected to a common bus;
a memory which includes an address space having a plurality of banks; and
a common bus arbitrating section which
arbitrates an access request to access the memory that is output from the plurality of processing blocks, and
controls data delivery through the common bus that receives the access request and is provided between the plurality of processing blocks and the memory,
wherein at least one processing block among the plurality of processing blocks includes a data transfer control device that exchanges bank accessing order to the memory for the same bank accessing order when another processing block access the memory, and wherein the data transfer control device accesses the banks in a reverse order to the order of the banks in the memory.

2. The data-processing apparatus according to claim 1, wherein the data transfer control device includes:
a buffer section which stores the data that is transferred between the memory and the processing block;
a buffer write control section which stores the data in the buffer section; and
a buffer read control section which reads the data stored in the buffer section.

3. The data-processing apparatus according to claim 2, wherein the data transfer control device further includes an operation mode register that sets the order of the data that is transferred between the memory and the processing block, and
the buffer write control section stores the data in storage regions of the buffer section corresponding to the banks based on the order of the data set by the operation mode register.

4. The data-processing apparatus according to claim 2, wherein the data transfer control device further includes an operation mode register that sets the order of the data that is transferred between the memory and the processing block, and
the buffer read control section reads the data from storage regions of the buffer section corresponding to the banks based on the order of the data set in the operation mode register.

5. The data-processing apparatus according to claim 1, wherein the data is data which has regions in a first direction and a second direction,
the data-processing apparatus further includes the plurality of exchange-processing blocks,
at least one exchange-processing block among the plurality of exchange-processing blocks accesses the banks in the memory in the first direction of the data, and
at least another exchange-processing block among the plurality of processing blocks that performs the exchange of the access order to the banks in the memory accesses the banks in the memory in the second direction of the data.

6. The data-processing apparatus according to claim 5, wherein the data is image data,
the first direction is a horizontal direction of the image data, and
the second direction is a vertical direction of the image data.

7. A data transfer control device used for a data-processing apparatus including a plurality of processing blocks which is connected to a common bus; a memory which includes an address space having a plurality of banks; and a common bus arbitrating section which arbitrates an access request to access the memory that is output from the plurality of processing blocks, and controls data delivery through the common bus which receives the access request and is provided between the plurality of processing blocks and the memory,
wherein the data transfer control device is provided in at least one processing block among the plurality of processing blocks, and exchanges bank accessing order to the memory for the same bank accessing order when another processing block access the memory, and wherein the data transfer control device accesses the banks in a reverse order to the order of the banks in the memory.

* * * * *